(12) United States Patent
Leather et al.

(10) Patent No.: US 12,074,649 B2
(45) Date of Patent: *Aug. 27, 2024

(54) APPARATUS, MEASUREMENT SYSTEM FOR TESTING AN APPARATUS AND METHODS FOR OPERATING THE SAME

(71) Applicant: Fraunhofer-Gesellschaft zur Förderung der angewandten Forschung e.V., Munich (DE)

(72) Inventors: Paul Simon Holt Leather, Berlin (DE); Thomas Haustein, Potsdam (DE); Kei Sakaguchi, Berlin (DE); Lars Thiele, Berlin (DE); Thomas Wirth, Kleinmachnow (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/452,758

(22) Filed: Aug. 21, 2023

(65) Prior Publication Data

US 2023/0396344 A1    Dec. 7, 2023

Related U.S. Application Data

(60) Continuation of application No. 17/747,256, filed on May 18, 2022, now Pat. No. 11,770,195, which is a
(Continued)

(30) Foreign Application Priority Data

May 31, 2017    (EP) ..................... 17173792

(51) Int. Cl.
*H04B 17/12* (2015.01)
*H01Q 3/26* (2006.01)
*H04W 24/08* (2009.01)

(52) U.S. Cl.
CPC ............. *H04B 17/12* (2015.01); *H01Q 3/267* (2013.01); *H04W 24/08* (2013.01)

(58) Field of Classification Search
CPC ...... H04B 17/12; H04B 7/0617; H04B 17/29; H01Q 3/267; H04W 24/08
(Continued)

(56) References Cited

U.S. PATENT DOCUMENTS 7,397,019 B1    7/2008    Byars et al.
7,430,412 B1    9/2008    Steen
(Continued)

FOREIGN PATENT DOCUMENTS

CN    1830159 A    9/2006
CN    101783708 A    7/2010
(Continued)

OTHER PUBLICATIONS

Chinese language office action dated Dec. 19, 2023, issued in application No. CN 202210651754.8.
(Continued)

*Primary Examiner* — Mahendra R Patel
(74) *Attorney, Agent, or Firm* — McClure, Qualey & Rodack, LLP

(57) ABSTRACT

An apparatus comprises an antenna array comprising a plurality of antennas. The apparatus comprises a communication interface for receiving a control signal. The apparatus is configured to form a first radio frequency beam in accordance with a predetermined test case independent from the control signal using the antenna array. The apparatus is configured to form a second radio frequency beam that is
(Continued)

different from the predetermined test case responsive to instructions contained in the control signal.

25 Claims, 12 Drawing Sheets

Related U.S. Application Data division of application No. 16/697,697, filed on Nov. 27, 2019, now Pat. No. 11,343,002, which is a continuation of application No. PCT/EP2018/062990, filed on May 17, 2018.

(58) Field of Classification Search
USPC .......................................................... 455/424
See application file for complete search history.

(56) References Cited

U.S. PATENT DOCUMENTS

| | | | |
|---|---|---|---|
| 7,539,489 B1* | 5/2009 | Alexander | H04W 24/06 455/67.11 |
| 7,683,842 B1* | 3/2010 | Engel | H04B 17/20 342/170 |
| 8,903,326 B2 | 12/2014 | Gregg et al. | |
| 8,912,809 B2* | 12/2014 | Han | H01Q 9/0442 324/750.01 |
| 8,995,938 B2* | 3/2015 | Ali | H04B 1/3838 455/127.1 |
| 9,350,405 B2* | 5/2016 | Zhu | H04B 1/0458 |
| 9,404,965 B2* | 8/2016 | Nickel | G01R 31/3025 |
| 9,476,925 B2* | 10/2016 | Duchesne | G01R 29/0892 |
| 10,187,180 B2* | 1/2019 | Sorrentino | H04L 1/0026 |
| RE47,412 E | 5/2019 | Greene | |
| 10,288,447 B2 | 5/2019 | Garre et al. | |
| 10,398,362 B2* | 9/2019 | Terashima | G16H 10/40 |
| 10,681,769 B2 | 6/2020 | Lee et al. | |
| 11,617,517 B2 | 4/2023 | Tupin, Jr. | |
| 2002/0071406 A1 | 6/2002 | Bursztejn et al. | |
| 2002/0158801 A1 | 10/2002 | Crilly | |
| 2004/0266423 A1 | 12/2004 | Morikawa et al. | |
| 2005/0123138 A1 | 6/2005 | Abe et al. | |
| 2005/0134287 A1 | 6/2005 | Satou | |
| 2006/0154610 A1 | 7/2006 | Moray | |
| 2006/0194553 A1* | 8/2006 | Ozaki | H04W 24/00 455/226.1 |
| 2008/0016422 A1 | 1/2008 | Ochi | |
| 2008/0092443 A1 | 4/2008 | Herman et al. | |
| 2008/0129615 A1* | 6/2008 | Breit | H04W 56/00 343/703 |
| 2008/0204322 A1* | 8/2008 | Oswald | G01S 5/04 342/465 |
| 2008/0218255 A1 | 9/2008 | Fujiyama et al. | |
| 2009/0102927 A1 | 4/2009 | Tatsuta et al. | |
| 2009/0290069 A1* | 11/2009 | De Vaan | H04N 5/57 348/E5.119 |
| 2011/0160549 A1 | 6/2011 | Saroka | |
| 2011/0182202 A1 | 7/2011 | Olofsson et al. | |
| 2012/0017235 A1 | 1/2012 | Kudelsk et al. | |
| 2012/0063343 A1 | 3/2012 | Yuda et al. | |
| 2012/0098713 A1 | 4/2012 | Caballero et al. | |
| 2012/0122414 A1 | 5/2012 | Noguchi et al. | |
| 2013/0005318 A1 | 1/2013 | Motegi et al. | |
| 2013/0237272 A1 | 9/2013 | Prasad | |
| 2013/0244594 A1* | 9/2013 | Alrabadi | H04B 7/0426 455/78 |
| 2014/0024323 A1* | 1/2014 | Clevorn | H04B 7/0689 455/78 |
| 2014/0075354 A1 | 3/2014 | Ko | |
| 2014/0128115 A1 | 5/2014 | Siomina | |
| 2014/0170983 A1 | 6/2014 | LeVeille | |
| 2015/0118969 A1 | 4/2015 | Chen et al. | |
| 2015/0163084 A1 | 6/2015 | Yokoshima et al. | |
| 2015/0177277 A1* | 6/2015 | Nickel | G01R 31/2822 324/629 |
| 2015/0215932 A1 | 7/2015 | Wang | |
| 2015/0301338 A1 | 10/2015 | Van Heugten | |
| 2015/0350228 A1 | 12/2015 | Baxley et al. | |
| 2015/0365157 A1 | 12/2015 | Yang et al. | |
| 2016/0072594 A1 | 3/2016 | Yuan et al. | |
| 2016/0182164 A1 | 6/2016 | Wang | |
| 2016/0226601 A1 | 8/2016 | Hu et al. | |
| 2016/0323757 A1 | 11/2016 | Braun et al. | |
| 2016/0359573 A1 | 12/2016 | Kottkamp et al. | |
| 2016/0359717 A1 | 12/2016 | Sheya | |
| 2017/0041038 A1 | 2/2017 | Kirkpatrick et al. | |
| 2017/0048769 A1 | 2/2017 | Taylor | |
| 2017/0184699 A1 | 6/2017 | Honma et al. | |
| 2017/0222711 A1* | 8/2017 | Sorrells | H01Q 3/267 |
| 2018/0027434 A1* | 1/2018 | Foegelle | H04B 7/0617 455/67.13 |
| 2019/0068315 A1 | 2/2019 | Ryden et al. | |
| 2019/0077024 A1 | 3/2019 | Vahasoyrinki | |
| 2019/0222250 A1 | 7/2019 | Chapman et al. | |
| 2019/0285678 A1 | 9/2019 | Abadie et al. | |
| 2020/0092646 A1 | 3/2020 | Yamamoto et al. | |
| 2020/0099458 A1 | 3/2020 | Leather et al. | |

FOREIGN PATENT DOCUMENTS

| | | | | |
|---|---|---|---|---|
| CN | 101783708 A | * | 7/2010 | |
| CN | 101904191 A | | 12/2010 | |
| CN | 102833768 A | * | 12/2012 | ............. H04B 17/20 |
| CN | 102833768 A | | 12/2012 | |
| CN | 102917397 A | | 2/2013 | |
| CN | 104380618 A | | 2/2015 | |
| CN | 104969485 A | | 10/2015 | |
| CN | 105792349 A | | 7/2016 | |
| CN | 110999136 A | * | 4/2020 | ............. H01Q 3/267 |
| CN | 110999136 B | | 6/2022 | |
| EP | 1503518 A1 | * | 2/2005 | ............. H01Q 3/267 |
| EP | 3 104 539 A1 | | 12/2016 | |
| GB | 2 422 068 A | | 12/2006 | |
| WO | 2004/082169 A1 | | 9/2004 | |
| WO | 2005/015771 A1 | | 2/2005 | |
| WO | WO-2005045455 A2 | * | 5/2005 | ......... G01S 13/0209 |
| WO | 2005/055409 A2 | | 6/2005 | |
| WO | 2006/047677 A1 | | 5/2006 | |
| WO | 2008/031112 A2 | | 3/2008 | |
| WO | WO-2008031112 A2 | * | 3/2008 | ........... G01R 29/105 |
| WO | 2012/167111 A2 | | 12/2012 | |
| WO | WO-2012167111 A2 | * | 12/2012 | ........... H01Q 21/061 |
| WO | 2013/141873 A1 | | 9/2013 | |
| WO | WO-2013141873 A1 | * | 9/2013 | ............. H04B 1/40 |
| WO | 2017/067591 A1 | | 4/2017 | |

OTHER PUBLICATIONS

English language translation of office action dated Dec. 19, 2023 (pp. 1-9 of attachment).

3GPP TR 37.842 V13.1.0, 3rd Generation Partnership Project; Technical Specification Group Radio Access Network; Evolved Universal Terrestrial Radio Access (E-UTRA) and Universal Terrestrial Radio Access (UTRA; Radio Frequency (RF) requirement background for Active Antenna System (AAS) Base Station (BS) (Release 13), Dec. 2016.

3GPP TR 37.976 V13.0.0, 3rd Generation Partnership Project; Technical Specification Group Radio Access Network; Measurement of radiated performance for Multiple Input Multiple Output (MIMO) and multi-antenna reception for High Speed Packet Access (HSPA) and LTE terminals (Release 13), Jan. 2016.

3GPP TS 36.141 V14.2.0, 3rd Generation Partnership Project; Technical Specification Group Radio Access Network; Evolved Universal Terrestrial Radio Access (E-UTRA); Base Station (BS) conformance testing (Release 14), Dec. 2016.

3GPP TS 37.320 V13.1.0, 3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 13), Mar. 2016.

(56) References Cited

OTHER PUBLICATIONS

Directive 2014/53/EU of the European Parliament and of the Council of Apr. 16, 2014 on the harmonisation of the laws of the Member States relating to the making available on the market of radio equipment and repealing Directive 1999/5/EC.
ETSI EN 303 095: V1.2.1, Reconfigurable Radio Systems (RRS); Radio Reconfiguration related Architecture for Mobile Devices, 2015.
ETSI TR 102 967: V1.2.1, Reconfigurable Radio Systems (RRS); Use Cases for dynamic equipment reconfiguration, ETSI, 2015.
Chinese Language Office Action dated Jun. 21, 2021 in related Chinese patent application No. 201880050368.5.
Partial European Search Report dated Jun. 30, 2022, issued in application No. EP 22166427.9.
3GPP TS 37.320 V14.0.0; 3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 14); Mar. 2017; pp. 1-26.
Chinese language office action dated May 28, 2024, issued in application No. CN 202210651754.8.
English language translation of office action dated May 28, 2024 (pp. 1-8 of attachment).

\* cited by examiner

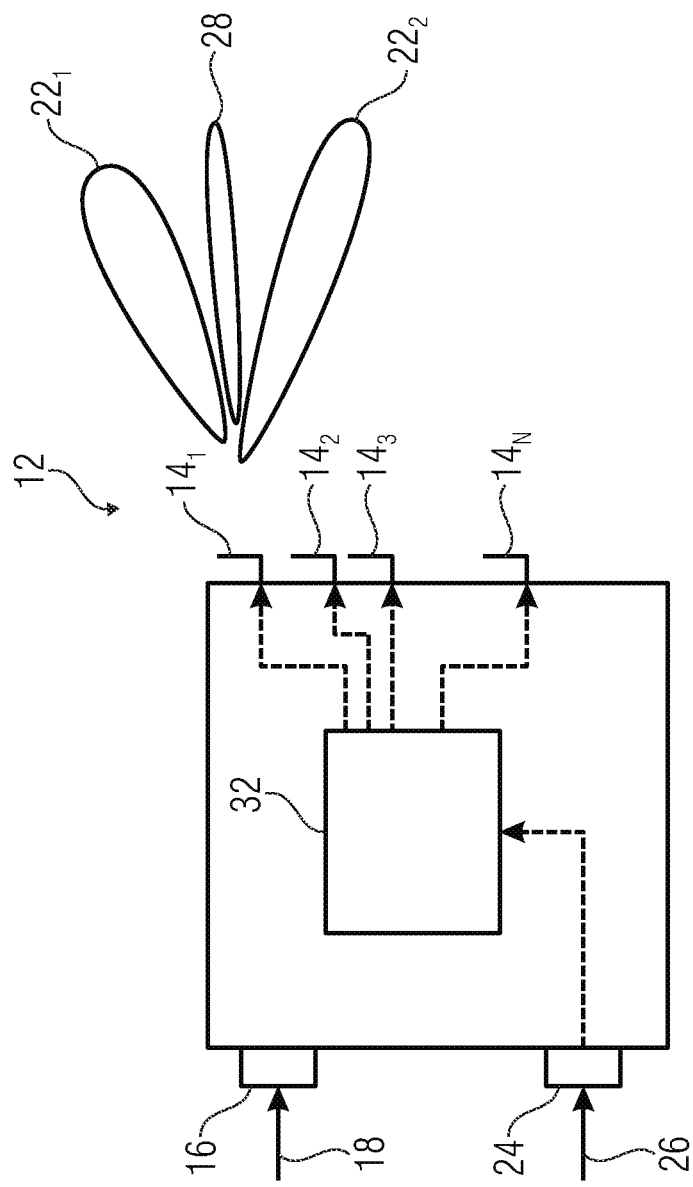

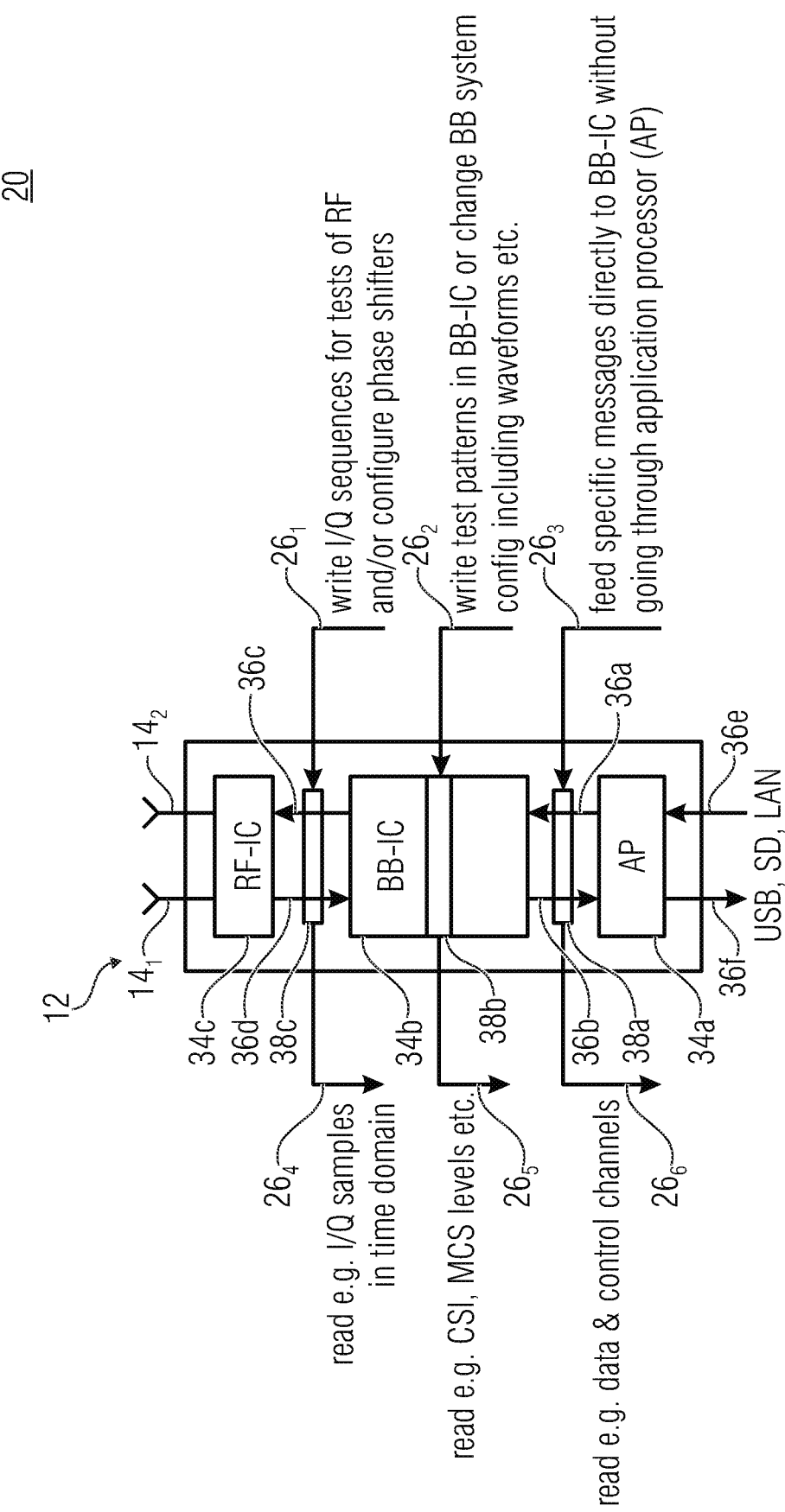

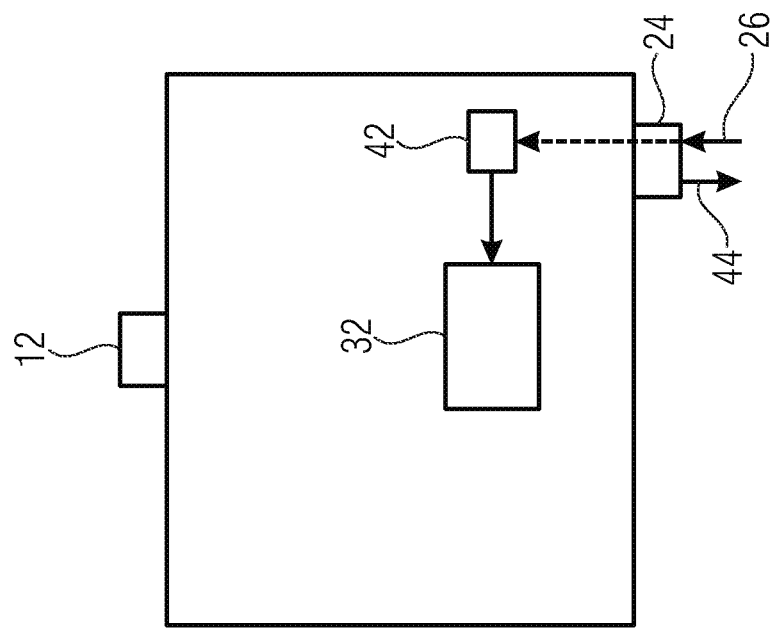

700

| Forming a second spatial electromagnetic radiation characteristic different from the predetermined test case responsive to instructions contained in the control signal | —710 |

| Receiving the sensor signal | —810 |

| Transmitting a control signal to the apparatus such that the control signal comprises instructions to form a second spatial electromagnetic radiation characteristic different from a predetermined test case | —820 |

Fig. 8

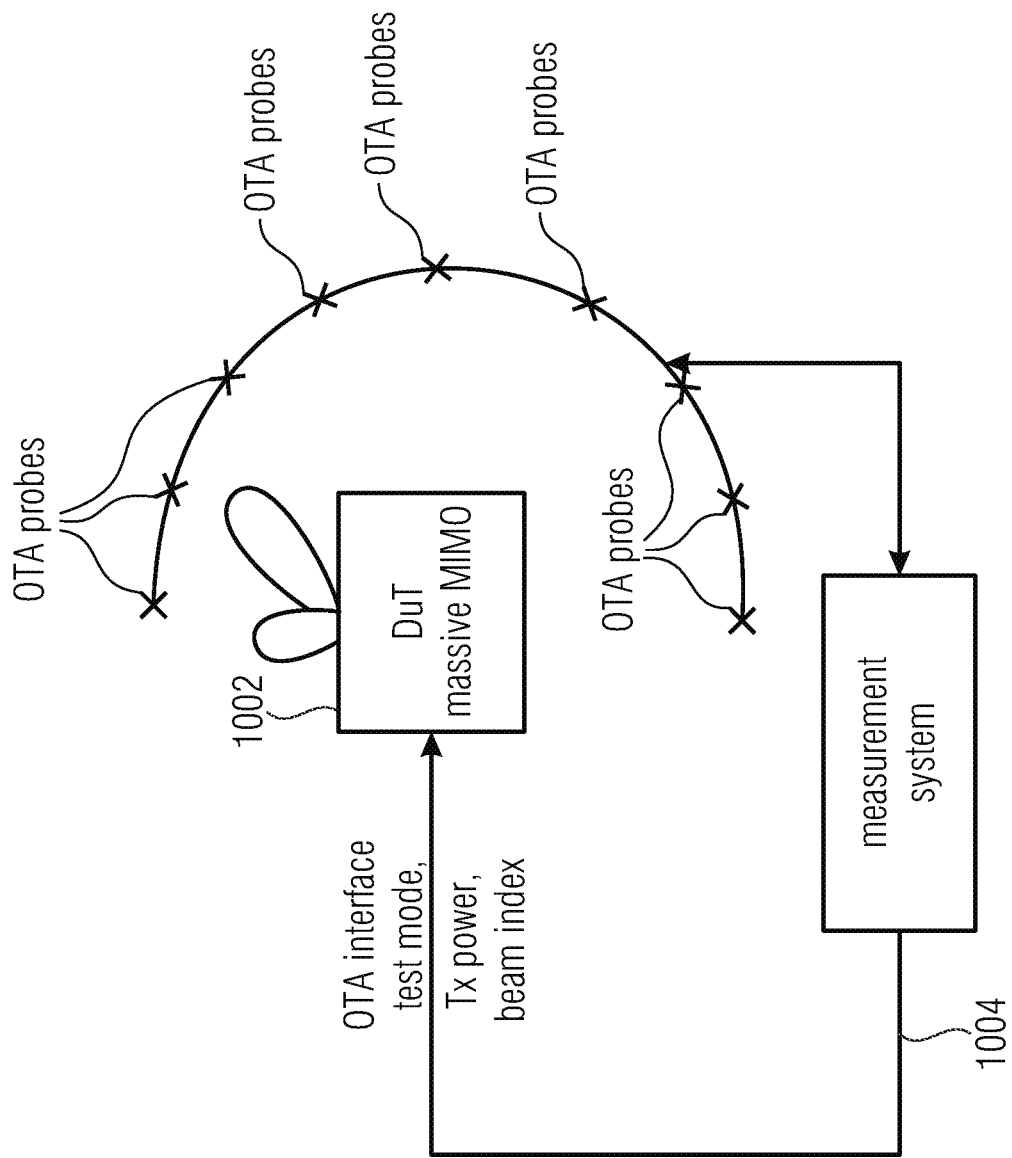

APPARATUS, MEASUREMENT SYSTEM FOR TESTING AN APPARATUS AND METHODS FOR OPERATING THE SAME

CROSS-REFERENCES TO RELATED APPLICATIONS

This application is a continuation of copending U.S. patent application Ser. No. 17/747,256, filed May 18, 2022, which in turn is a divisional of copending U.S. application Ser. No. 16/697,697, filed Nov. 27, 2019, which is a continuation of copending International Application No. PCT/EP2018/062990, filed May 17, 2018, which is incorporated herein by reference in its entirety, and additionally claims priority from European Application No. EP 17173792.7, filed May 31, 2017, which is incorporated herein by reference in its entirety.

BACKGROUND OF THE INVENTION

The present invention relates to an apparatus, in particular an apparatus for wireless communication using a wireless communication interface. The invention further relates to a measurement system for testing an apparatus by receiving a signal having a spatial electromagnetic radiation characteristic the apparatus. The invention further relates to a method for operating an apparatus and to a method for operating a measurement system. The invention further relates to a method for closed loop test and measurement procedures using a Measurement Control Channel and associated message space and protocol for "over the air" test and measurement procedures.

Over-the-Air (OTA) measurements become an important means in order to measure specific antennas properties, e.g., performance tests of array antennas, while the antenna is actively using one, a few or many antenna elements. This is the case, e.g., in joint array signal processing, e.g., for performance evaluation of beamforming (BF) algorithms. Furthermore, in many cases antenna ports of individual antenna elements are either not accessible for measurements or a measurement of their isolated radio frequency (RF) performance is of little value or almost meaningless, for characterizing the joint performance of the many elements. Therefore, OTA testing and measurements (T&M) become an important aspect for performance and compliance evaluation of wireless devices, especially for 4G, 5G and other current and future wireless communication systems.

Candidate technologies currently discussed for 5G are Massive Multiple Input Multiple Output (Massive MIMO) systems and scenarios involving a massive number of communication devices. These may operate in so-called enhanced mobile broadband (eMBB), in massive Machine Type Communication (mMTC) and/or narrowband (NB)-Internet of Things (IoT) scenarios involving a high number (potentially millions) of communication links, e.g., sensor nodes.

Massive MIMO systems involve a significantly large number of antennas, such as at least 2 antennas, at least 16 antennas, at least 32 antennas or at least 64 antennas and up to thousands of antennas on the base station (eNB) side, as well as a multi-antenna technique on the user equipment (UE) side. With this increased number of communication or antenna links, the overall system complexity grows substantially. Thus, these devices need a much higher amount of calibration and testing of all involved communication links. Ideally, this is performed directly in the field and under realistic constraints opposed to performing this in an artificial scenario.

Such calibration and testing may be performed would in Over-The-Air (OTA) measurements using a measurement system for testing a Device under Test (DuT). Such OTA measurements may be executed, for performance evaluation. Current T&M procedures follow mainly two options, as illustrated in FIGS. 9a and 9b.

FIG. 9a shows an extension of 3GPP TR 37.842 [1] in which a DuT 1002 is controlled from measurement equipment via an OTA interface.

FIG. 9b shows a schematic diagram of an extension of 3GPP TR 37.976 [2] in which the DuT 1002 is controlled from measurement equipment 1012 via a wireless extension of the OTA Interface 1004 of FIG. 9a.

In 3GPP TR 37.976, as illustrated in FIG. 9b, some OTA test methods of MIMO LTE (Long Term Evolution) terminals are already discussed, and (OTA) interfaces to be connected with base station (BS) emulator and waveforms to be used for tests have been proposed.

Using this available communication between the measurement equipment and the DuT, several parameters and predefined messages can be exchanged over the existing interfaces. This may involve a list of different key performance indicators (KPIs), such as:

mode of test (test cases),
transmit (Tx) power,
waveform,
channel allocation,
data pattern,
reference signal,
. . .
etc.

SUMMARY

According to an embodiment, an apparatus may have: an antenna arrangement having at least one antenna; a communication interface for receiving a control signal; wherein the apparatus is configured to use a first spatial electromagnetic radiation characteristic in accordance with a predetermined test case independent from the control signal, using the antenna array; wherein the apparatus is configured to use a second spatial electromagnetic radiation characteristic different from the predetermined test case responsive to instructions contained in the control signal.

According to another embodiment, a measurement system may have: a plurality of sensors configured to receive a signal with a spatial electromagnetic radiation characteristic from an apparatus and to provide a sensor signal based on the received signal with the spatial electromagnetic radiation characteristic; a control unit configured to receive the sensor signal and to transmit a control signal to the apparatus; wherein the control signal has instructions to use a spatial electromagnetic radiation characteristic different from a predetermined test case.

According to another embodiment, a measurement system may have: a plurality of inventive apparatuses, operated in a wireless communication network cell; a coordinator node configured to operate the wireless communication network cell, the coordinator node having a control unit configured to transmit at least one control signal to the plurality of apparatus so as to orchestrate a test within the wireless communication network cell performed commonly by the plurality of apparatus.

According to another embodiment, a measurement system may have: a plurality of apparatus operated in a wireless communication network cell; a coordinator node having a control unit configured to transmit at least one control signal to the plurality of apparatus so as to orchestrate a test within the wireless communication network cell performed commonly by the plurality of apparatus.

Another embodiment may have a method for operating an apparatus having an antenna arrangement with at least one antenna and having a communication interface for receiving a control signal, wherein the apparatus is configured to use a first spatial electromagnetic radiation characteristic in accordance with a predetermined test case independent from the control signal, using the antenna arrangement, wherein the method may have the steps of: using a second spatial electromagnetic radiation characteristic different from the predetermined test case responsive to instructions contained in the control signal.

Another embodiment may have a method for operating a measurement system having a plurality of sensors configured to receive a signal with a spatial electromagnetic radiation characteristic from an apparatus and to provide a sensor signal based on the received signal, wherein the method may have the steps of: receiving the sensor signal; and transmitting a control signal to the apparatus such that the control signal has instructions to use a spatial electromagnetic radiation characteristic different from a predetermined test case.

A recognition of the present invention is that by defining a further communication interface that allows for receiving a control signal with an apparatus that may be tested as a DuT such that the apparatus may control its antenna array in a way different from predetermined test cases, such that new apparatus and/or new test cases may be tested in an existing standard, i.e., a "forward" compatibility may be obtained. Based on the high number of antennas of a DuT, an access to the physical antenna port of the apparatus operated as DuT may be impossible or meaningless during a test case when using the existing interfaces for predetermined test cases. Therefore, by implementing a special communication interface, further or different behaviors of the DuT may be triggered so as to allow for a detailed OTA measurement.

According to an embodiment, an apparatus comprises an antenna arrangement comprising at least one antenna. The apparatus comprises a communication interface for receiving a control signal. The apparatus is configured to use a first spatial electromagnetic radiation characteristic for receiving or transmitting with the antenna arrangement in accordance with a predetermined test case independent from the control signal, using the antenna array. The apparatus is configured to use a second spatial electromagnetic radiation characteristic being different from the predetermined test case responsive to instructions contained in the control signal. Predetermined test cases may fail to allow for a full-test or a test of all critical scenarios. Using spatial electromagnetic radiation characteristics being different from the predetermined test case may allow testing of cases or scenarios being different from predetermined ones and may thus allow for a high quality of the test result.

According to an embodiment, the apparatus is configured to use the second spatial electromagnetic radiation characteristic in addition to the first spatial electromagnetic radiation characteristic or to disable the first spatial electromagnetic radiation characteristic responsive to using the second spatial electromagnetic radiation characteristic based on the control signal. This may allow for performing tests with present measurement systems and to use the second spatial electromagnetic radiation characteristic with future measurement systems that are configured to transmit the control signal.

According to an embodiment, the apparatus is configured to receive the control signal from a test environment comprising a measurement system and comprising a plurality of sensor elements configured to receive a signal having the second spatial electromagnetic radiation characteristic. This may allow for a closed-loop test method or scenario.

According to an embodiment, the control signal is one of a set of control signals forming an associated message space being associated to a communication channel utilized via the communication interface. This may allow for providing a new and probably evolving message space so as to allow for a "forward" compatibility.

According to an embodiment, the control signal comprises instructions for the apparatus relating to at least one of a command to trigger actions; a command to synchronize timing, space, a frequency band or communication procedures; a command to configure settings; a command indicating a request to perform measurements with the antenna array; a command to use an encryption protocol and/or a command to perform identification, authentication and/or traceability. This may allow for testing a high number of key performance indicators that may relate to indicators other than the simple transmitting of signals.

According to an embodiment, the apparatus is configured to directly control the antenna array by performing at least one of a feeding output samples having a complex portion and a real portion to a circuit controlling the antenna array, wherein the output samples are indicated by the control signal; configuring phase shifters and/or gain values connected to the antenna array; providing, to a baseband circuit, a signal pattern in a baseband used for communication with the antenna array, wherein the pattern is indicated by the control signal; changing a baseband configuration of the baseband circuit; and/or application independently providing a signal to be transmitted with the antenna array to a baseband circuit, the signal to be transmitted indicated by the control signal. This may allow for directly addressing one or more antennas of the antenna array so as to measure the behavior of the DuT, probably with a low effect of modules blind to the configuration of the antenna array such as applications that are requested to use spatial electromagnetic radiation characteristics such as beams in present test scenarios.

According to an embodiment, the apparatus is configured to transmit an output signal using the communication interface. The apparatus is configured to perform at least one of receiving input samples having a complex portion and a real portion from a circuit controlling the antenna array, and including information indicating the input samples in the output signal; evaluating a baseband of the apparatus and including information indicating results of the evaluation in the output signal; and/or evaluating commands transmitted to an application hardware layer of the apparatus and including information indicating the commands in the output signal. This may allow for obtaining feedback from the apparatus based on a reception of a signal by the apparatus.

According to an embodiment, the communication interface is configured to operate in a frequency range out of band with respect to the spatial electromagnetic radiation characteristic; and/or the apparatus is configured to operate in a wireless communication network according to a first communication protocol using the antenna array, wherein the communication interface is configured to operate according to a different communication protocol. This may allow for a low inter-signal interference between the control signal and the operation of the DuT.

According to an embodiment, the communication interface is logically and physically separated from communication performed with the antenna array. This may allow for a further reduction or even prevention of inter-signal interference.

According to an embodiment, the predetermined test case is in accordance with a communication standard according to which the apparatus is configured to operate in a wireless communication network. This may allow for testing scenarios that are unmentioned or excluded from the standard.

According to an embodiment, the apparatus is configured to receive the control signal and to store information derived therefrom in a memory during a first time interval and to read the information derived from the control signal and to use the second spatial electromagnetic radiation characteristic during a second time interval. This may allow testing the DuT differently from the test cases in the predetermined scenarios even if no continuous communication between a measurement system and the apparatus is available, i.e., to pre-schedule the test. The DuT may store the settings to be used for forming the at least one second radio frequency beam and may execute the commands offline.

According to an embodiment, the apparatus is configured to implement a security mechanism for communication performed with the communication interface. This may allow for securing the measurement environment.

According to an embodiment, the apparatus is a base station configured to operate a wireless communication network cell or a user equipment configured to be operated by a base station. Thus, a base station may be controlled with the control signal, e.g., using a measurement system and/or a user equipment may be controlled with the control signal, e.g., using a measurement system.

According to an embodiment, a measurement system comprises a plurality of sensors configured to receive a signal having a spatial electromagnetic radiation characteristic from an apparatus and to provide a sensor signal based on the received signal. The measurement system comprises a control unit configured to receive the sensor signal and to transmit a control signal to the apparatus. The control signal comprises instructions to use a spatial electromagnetic radiation characteristic that is different from a predetermined test case. This may allow instructing the apparatus so as to use the spatial electromagnetic radiation characteristic according to parameters to be investigated during the test.

According to an embodiment, the control unit is configured to transmit a plurality of control signals to a corresponding plurality of apparatus. This may allow for testing the plurality of apparatus simultaneously and/or to test their inter-apparatus interference.

According to an embodiment, the measurement system is configured to transmit the control signal to an apparatus according to embodiments described herein so as to control the apparatus to transmit an output signal using the communication interface. This may be performed such that the output signal comprises information related to at least one of information related to input samples received by the apparatus; information related to an evaluation of a baseband of the apparatus; and/or information related to an evaluation of commands transmitted to an application hardware layer of the apparatus. This may allow implementation of a direct feedback-link which may be utilized to feedback to the measurement system the results estimated by the DuT.

According to an embodiment, the measurement system comprises a measurement chamber, wherein the control unit is configured to operate the measurement chamber comprising the plurality of sensors and wherein the chamber is configured to host the apparatus. This may allow for generating a low amount of interference for an environment of the measurement system.

According to an embodiment, a measurement system comprises a plurality of apparatus as described herein, operated in a wireless communication network cell and a base station configured to operate the wireless communication network cell, the base station comprising a control unit configured to transmit at least one control signal to the plurality of apparatus so as to orchestrate a test within the wireless communication network cell performed commonly by the plurality of apparatus. This allows for performing distributed tests coordinated by the base station.

According to an embodiment, a method for operating an apparatus comprising an antenna arrangement comprising at least one antenna and comprising a communication interface for receiving a control signal, wherein the apparatus is configured to use a first spatial electromagnetic radiation characteristic in accordance with a predetermined test case independent from the control signal, using the antenna arrangement, and the method comprises using a second spatial electromagnetic radiation characteristic different from the predetermined test case responsive to instructions contained in the control signal.

According to an embodiment, a method for operating a measurement system comprising a plurality of sensors configured to receive a signal having a spatial electromagnetic radiation characteristic from an apparatus and to provide a sensor signal based on the received signal, comprises receiving the sensor signal and transmitting a control signal to the apparatus such that the control signal comprises instructions to use a spatial electromagnetic radiation characteristic that is different from a predetermined test case.

BRIEF DESCRIPTION OF THE DRAWINGS

Embodiments of the present invention will be detailed subsequently referring to the appended drawings, in which:

FIG. 1 shows a schematic block diagram of an apparatus according an embodiment;

FIG. 2a shows a schematic block diagram of an apparatus according to an embodiment implementing a plurality of hardware layers;

FIG. 3a shows a schematic block diagram of an apparatus according to an embodiment comprising a memory;

FIG. 7 shows a schematic flow chart of a message for operating an apparatus according to an embodiment;

FIG. 8 shows a schematic flowchart of a method for operating a measurement system according to an embodiment;

FIG. 9a shows a schematic diagram illustrating a test and measurement procedure according to 3GPP TR 37.842.

DETAILED DESCRIPTION OF THE INVENTION

Figure 2B:
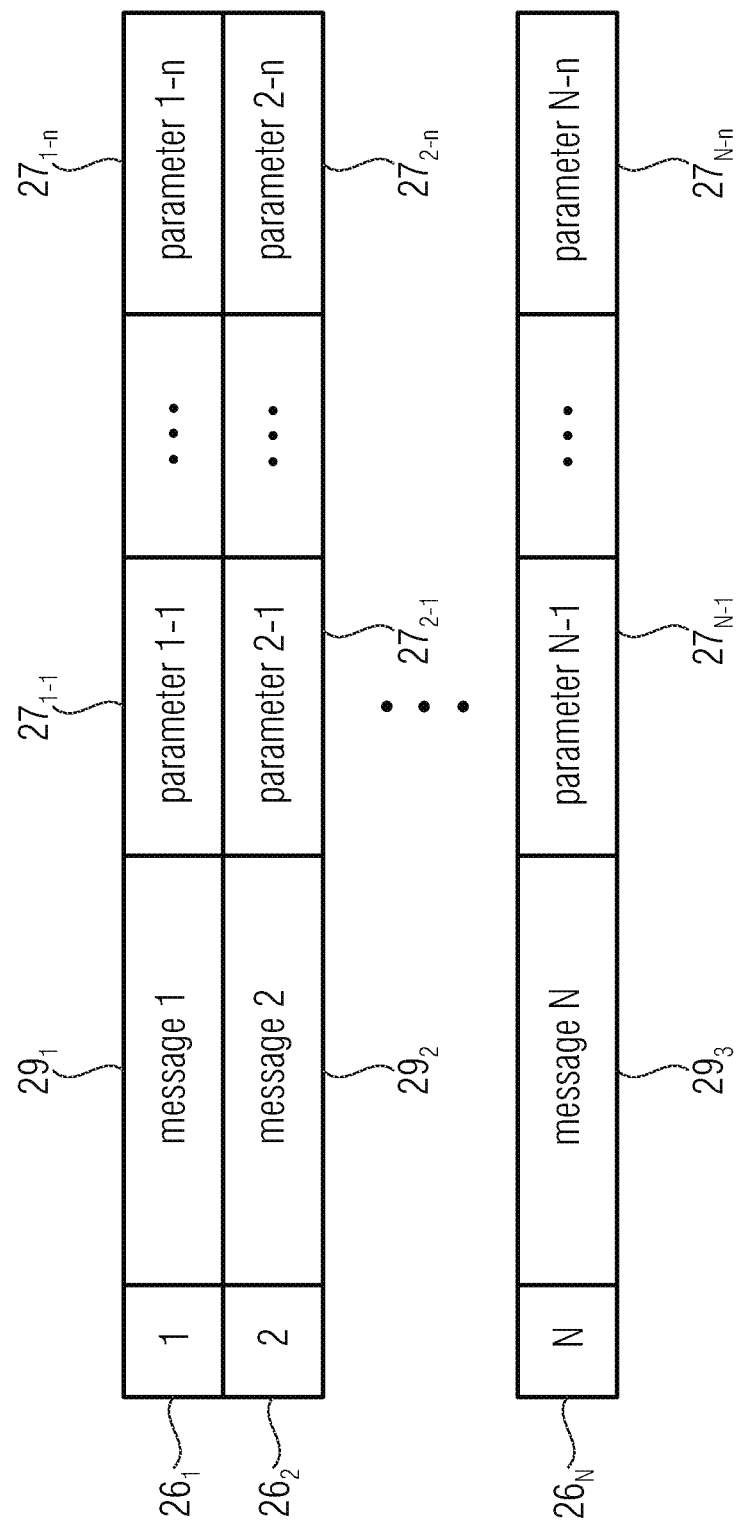
FIG. 2b shows a schematic diagram illustrating a structure of an associated message space according to an embodiment.

Equal or equivalent elements or elements with equal or equivalent functionality are denoted in the following description by equal or equivalent reference numerals even if occurring in different figures.

In the following description, a plurality of details is set forth to provide a more thorough explanation of embodiments of the present invention. However, it will be apparent to those skilled in the art that embodiments of the present invention may be practiced without these specific details. In other instances, well known structures and devices are shown in block diagram form rather than in detail in order to avoid obscuring embodiments of the present invention. In addition, features of the different embodiments described hereinafter may be combined with each other, unless specifically noted otherwise.

In the following, reference is made to an apparatus. Such an apparatus may comprise an antenna array that comprises a plurality of antennas and may be, e.g., an eMBB device, an Internet of Things (IoT) device and/or a massive MIMO device which means a base station or an apparatus operated thereby such as a user equipment (UE). Such devices may operate in mobile communication networks, for example, according to a Long Term evolution (LTE) standard, 5G or new radio. Before, during and after market introduction of such devices, tests may be performed so as to verify a compliance of the apparatus with respect to different requirements. Such a compliance to a certain test case may be tested, amongst other things, in view of a specific wireless communications standard and a behavior in the wireless environment. This may include the ability to form specific beams with an antenna array, to use minimum and/or maximum transmission powers and/or to adapt to specific scenarios within a specific time. During such tests, the apparatus is a tested device, i.e., a device under test (DuT). For testing the conformity with specifications, measurement systems may be used comprising sensors that are configured to sense and/or evaluate emissions of the DuT. During tests, it may be desired or needed to change an operation of the DuT, e.g., to test different operating modes sequentially with one test set-up. Such operation may be indirectly controlled by hardware layers that are connected to each other and transmit control signals to other layers, wherein the behavior of a source or destination layer may remain in-transparent for other layers, i.e., by simply changing an operation mode of the DuT it may remain unclear what exactly happens at the antenna array of the DuT. By using a control signal and/or a communication interface according to embodiments described herein, a direct control of the DuT may be achieved as it is possible to control specific operation of the DuT aside the operation mode.

Embodiments described herein may relate to apparatus that are configured to wirelessly operate in a wireless communication network. Such apparatus may be single-antenna devices that are configured to use an antenna arrangement having single antenna element for transmitting and/or receiving a signal, wherein this may be implemented with a dedicated transmission antenna and a separate dedicated reception antenna and/or with a combined antenna for receiving and transmitting a signal. Both configurations are referred to hereinafter as transceiving a signal. Such single antenna transceivers may use different 2D or 3D spatial electromagnetic radiation characteristics, for example, by adapting a polarization used for transmitting or receiving the respective signal. The pattern may have a center of gravity but is not required to have it. It may have an advantageous direction but is not required to have it. For example, the spatial electromagnetic radiation characteristic may be or may comprise a pattern having a polarization-dependent resolution although using an antenna that is configured to emit a signal radially symmetrical. Alternatively, an apparatus may comprise an antenna arrangement that comprises a plurality of antennas forming an antenna array. Such an antenna array may allow for beamforming, i.e., to generate an advantageous direction for transmission and/or reception and thus for transceiving. The used spatial electromagnetic radiation characteristic may relate to beams formed for transmission and/or reception. Although embodiments are described hereinafter in connection with beamforming, those explanations given refer to single-antenna arrangements without limitations.

Thus, the antenna arrangement may comprise one single antenna for transmission and/or reception. The first and second spatial electromagnetic radiation characteristic may relate to at least one of a polarization of a transceived signal to which the antenna arrangement is adapted and an at least two dimensional pattern transceived with the antenna. Alternatively, the antenna may be an antenna array comprising a plurality of antennas. The spatial electromagnetic radiation characteristic may relate to at least one beam that is formed for transceiving a signal with the antenna array.

The antenna arrangement may comprise a plurality of antennas that may be controlled by the apparatus. The plurality of antennas may form a pre-configured antenna array or may be used as antenna array through a common control implemented with the apparatus.

A beam generated with the antenna array formed by the plurality of antennas may be used for transmission and/or reception of electromagnetic signals along and/or from a direction along which the beam points. Thus, when referring to a beam, this may be understood as a direction of the antenna array for transmission and/or reception.

Different beams may therefore refer to different directions. Alternatively or in addition, different beams may comprise the same direction in space and may be operated at different resources such as code and/or frequency. Thus, a directions of beams may be the same but the beams may be operated over different bandwidth. In other words, a radio frequency beam may be understood as comprising from a set of parameters such as bandwidth, directions/beam pattern, carrier frequency, spectrum allocation, time allocation, wave form and the like. Different beams may differ in at least one of parameter.

FIG. 1 shows a schematic block diagram of an apparatus 10 according an embodiment. The apparatus 10 may be, by non-limiting example, a user equipment (UE), an Internet of Things device (IoT) and/or a base station. The apparatus 10 comprises an antenna array 12 having a plurality of antennas 14$_1$ to 14$_N$. Although four antennas 14$_1$, 14$_2$, 14$_3$ and 14$_N$ are illustrated, a different number of antenna elements 14 may be implemented in the antenna array 12, for example, two or more, four or more, five or more, eight or more, sixteen or more, 20 or more, 32 or more, 50 or more, 64 or more or the like.

The apparatus 10 may comprise an OTA interface 16 for receiving a signal 18 indicating a test mode, a transmit (Tx) power and/or a beam index to be implemented. The signal 18 may cause the apparatus 10 to act according to a predetermined test case that may be defined, for example, in accordance with a test scenario, a test protocol and/or a communication standard according to which the apparatus 10 is configured to operate with the arrangement 12 that may be an antenna array but may also be implemented as single-reception antenna and/or single transmit antenna. For example, the apparatus 10 may be configured to use a first spatial electromagnetic radiation characteristic such as forming at least one radio frequency beam $22_1$ and/or $22_2$ in accordance with the predetermined test case indicated in the signal 18. The number of beams may thus be 1 or more, 2 or more, 3 or more or even higher, e.g., 4. For example, the signal 18 may indicate which of the beams $22_1$ and/or $22_2$ is to be transmitted, at which power one or more of the beams 22 are to be transmitted or the like.

The apparatus 10 comprises a communication interface 24 configured to receive a control signal 26. The control signal 26 may indicate information or a command to form at least one radio frequency beam 28 that is different from the predetermined test case. The apparatus 10 is configured to use a second spatial electromagnetic radiation characteristic, e.g., forming the radio frequency beam 28 responsive to the instructions contained in the control signal 26. In single-antenna configurations, the predetermined test case may relate to use a polarization or the like. In the case of being different from the predetermined test case, a different polarization or the like may be used. In contrast to the signal 18, that may contain instructions indicating a test case, a beam index or the like that is transformed or converted by the apparatus 10 to a specific behavior which is possibly not directly controllable by the signal 18 (i.e., a specific test case may either be used or not), the control signal 26 may allow for a more direct control as it allows for at least implementing test cases or test scenarios different from the scenarios covered by the signal 18. A number of second beams 28 may be 1 or more, 2 or more, 3 or more or even higher, e.g., 4.

Between the apparatus 10, i.e., the communication interface 24, and a corresponding communication interface at a different apparatus such as a measurement system, a Measurement Control Channel (MCC) may be established. The MCC may define a logical channel between the different apparatus and the apparatus 10. For example, the test measurement system may collect pre-configured KPIs and may store them for further benchmarks and/or system performance evaluations. The MCC may be realized in various ways and options. The communication interface 24 may be, for example, a cable interface, a wireless interface, an optical interface, an infrared interface and/or a combination thereof. The communication interface 24 may be configured to establish a point-to-point connection, a connection via multiple instances (multi-hop) and/or a network-communication such as using the Internet. For example, the communication interface 24 may be a standardized and/or proprietary or a via-the-air interface channel such as a 5G air interface (AI). Alternatively or in addition, the communication interface 24 may be an auxiliary interface that allows for establishing an auxiliary channel that is non-integrated in the communication of the antenna array 12.

In other words, the communication interface 24 may be configured to establish a connection outside the radio access network (RAN) that is under test when the apparatus 10 is a DuT. Thus, the communication interface 24 may be a wireless and/or a wired communication interface. The communication interface 24 being implemented as a wireless communication interface may advantageously be implemented as a communication interface that is configured to operate in a frequency range out of band with respect to the frequency beams 22 and 28. This may allow for low interference between the control signal 26 and the communication performed in the frequency ranges of the beams 22 and 28. Alternatively or in addition, the apparatus 10 may be configured to operate in a wireless communication network according to a specific communication protocol, such as, a protocol derived from LTE, 5G or the like. The communication interface 24 may be configured to operate according to a different communication protocol which may allow the control signal 26 to be recognized as noise in the communication environment implementing the protocol being used for forming the beams 22 and 28. Thus, although being indicated as being a different element in view of the antenna array 12, the communication interface 24 may alternatively be the antenna array 12.

The apparatus 10 may comprise a processor 32, for example, a central processing unit (CPU), a field programmable gate array (FPGA), a microprocessor or the like. The processor 32 may be configured to evaluate the control signal 26 and to control the antenna array 12 and/or the antenna elements 14, so as to form the beam 28. The beam 28 may comprise a same and/or different frequency range when compared to the beams $22_1$ and $22_2$.

The control signal 26 may comprise a structure that may be arbitrary but may also comprise a structure that is in accordance with an associated message space (AMS). The AMS may go beyond a definition of messages such as provided in 3GPP TS 37.320 [4] (radio measurement collection for minimization of drive test (MDT) which is called MDT mode). The control signal 26 may comprise instructions that may include but are not limited to a command to trigger actions, a command to synchronize timing, space, frequency band and/or communication procedures such as a transmission of specific messages, a command to configure settings, a command indicating a request to perform measurements with the antenna array and/or a command indicating a request to report results of such measurements, a command to use an encryption protocol for communication over the communication interface 24 and/or the antenna array 12, and/or a command to perform identification, authentication and/or traceability. Actions that may be triggered by the commands may include, but are not limited to:

An action to prepare, coordinate, orchestrate and/or synchronize the operation of multiple devices;
An action to trigger the above immediately;
An action to trigger the above at some time in the future;
An action to trigger the staggered execution of events in the future;
An action to trigger certain network requests;
An action to trigger the download of data;
An action to trigger the upload of data;
An action to trigger both the download and upload of data;
An action to trigger predefined tests;
Tests included self-checks, inter-device checks, device-network tests;
An action to trigger calibration;
An action to trigger maintenance operations;
wherein this includes a single action or more actions in any combination thereof.

Traceability may relate to actions that allow for determining a movement or position of a respective node, such as triggering the receiver to transmit a message that contains position information and/or that allows to determine the position such as determining a beam in which the message is received.

Alternatively, the communication interface 24 may be logically and/or physically separated from the communication performed with the antenna array 12 which may allow for a low interference of the communication interface 24 and communication performed thereover influencing communication over the antenna array 12.

Responsive to the control signal 26, the apparatus 10 may be configured to generate the radio frequency beam 28 in addition to the radio frequency beam $22_1$ and/or $22_2$. Alternatively, the apparatus 10 may be configured to disable the radio frequency beams 22 responsive to the control signal 26, i.e., to generating the radio frequency beam 28.

The control signal 26 may be received from a test environment that comprises a measurement system. The measurement system may comprise a plurality of sensor elements configured to receive the radio frequency beam 28. This may allow for a closed loop test.

The control signal 26 may comprise instructions for the apparatus 10. The instructions may relate to one or more actions to be initiated by the apparatus 10. By non-limiting example only, the instruction may relate to a command to trigger actions, a command to synchronize a timing, a space, a frequency band or communication procedures. This may refer to network resources. For example, a synchronization in space may refer to a synchronization of a direction or a space into which the radio frequency beam 28 is transmitted by the apparatus 10 and the measurement system that indicates which space is to be monitored at a specific time. Alternatively or in addition, the control signal 26 may relate to a command to configure settings such as specific controls for the antenna array 12. Alternatively or in addition, the control signal 26 may relate to a command indicating a request to perform measurements with the antenna array. Such a command may indicate that the apparatus 10 has to monitor the network resources with the antenna array 12. The apparatus 10 may monitor the network resource, i.e., it may receive signals with the antenna array 12 responsive to such a command. The apparatus 10, the processor 32 respectively, may be configured to evaluate parameters of such a reception which may comprise a transmission power, a transmission direction, a bit error rate or other parameters. Alternatively or in addition, the control signal 26 may relate to a command to use an encryption protocol for a communication performed over the antenna array 12 and/or communication performed over the interface 24, wherein such a communication may relate to a transmission and/or a reception. Alternatively or in addition, the control signal 26 may relate to a command to perform identification, authentication and/or traceability, i.e., to perform protocol-specific actions in the network. A measurement system that transmits the control signal 26 may simulate or emulate such a network such that a test may be performed that relates to a behavior of the apparatus 10 within the network.

As stated above, the apparatus 10 may be a DuT. The apparatus 10 may be a base station configured to operate a wireless communications network cell. As it will be described later in more detail, this is only one of the possible configurations enabled by the embodiments described herein. The apparatus 10 being a base station may be tested itself, for example, using a measurement system, e.g., in a laboratory or the like in which a measurement system coordinates a test. Alternatively, the apparatus 10 itself may trigger or instruct a test, e.g., during real-life operation by instructing other nodes within range to participate in a test coordinated by the apparatus 10. For example, UEs may be utilized as measurement probes.

FIG. 2a shows a schematic block diagram of an apparatus 20 according to an embodiment. The apparatus 20 is illustrated as implementing a plurality of hardware layers 34a to 34c, wherein according to other embodiments, a different number of layers 34 may be implemented such as one layer, two layers, four layers or more.

The apparatus 20 may comprise a layer 34a that implements an application specific layer that is connected to an outside world via a communication interface such as USB, a memory such as an SD Card or a network such as a local area network (LAN). The apparatus 20 may comprise another layer 34b that is a baseband (BB) integrated circuit (IC). The layer 34b may be connected to the layer 34a, for example, allowing the application layer to indicate a signal or a message to be transmitted as indicated by arrow 36a. The baseband-integrated circuit 34b may be configured to convert the application specific information received from the layer 34a to information in the baseband, for example, by defining a spectrum of the signal to be transmitted. Alternatively or in addition and as indicated by an arrow 36b, the layer 34b may provide information to the layer 34a about a signal received with the antenna array 12, wherein the signal may be transformed to the baseband. The layer 34b may provide information to the layer 34c that is, for example, a radio frequency (RF) IC for controlling the radio frequency emission. The layer 34c may be configured to convert the baseband signal provided by the layer 34b to an RF signal that may be transmitted by radio frequency beams 22 and/or 28. As indicated by an arrow 36c and an arrow 36d, a connection between the layers 34b and 34c may be bi-directional. As indicated by arrows 36e and 36f, a connection of the apparatus 20 to the outside world via the layer 34a may also be bi-directional.

Between two layers, interfaces 38 may be arranged, at least logically. A first interface 38a may be arranged between the layers 34a and 34b. Another interface 38b may be arranged at, or may be a part of, the layer 34b, i.e., the BB-IC. Another interface 38c may be arranged between the layers 34b and 34c. The interfaces 38a to 38c may allow for inserting or extracting information and/or signals. Such an insertion and/or extraction may be initiated or instructed by the control signal $26_1$ being a version or a part of the control signal 26. By non-limiting example only, the control signal 26 may comprise a command that is interpreted by the apparatus 20 so as to directly control the antenna array 12. For example, the control signal $26_1$ may instruct the apparatus 20 such that the apparatus 20 feeds output samples to be transmitted over the antenna array 12 to the interface, the RF-IC respectively. The output samples may comprise a complex portion and a real portion, i.e., so-called I/Q samples, generated and/or controlled by the layer 34c, i.e., the RF-IC circuit controlling the antenna array 12. Thus, I/Q sequences may be written for tests of the RF performance. Alternatively or in addition, the control signal $26_1$ may comprise commands to configure phase shifters of the antenna array 12, for example, to modify a direction of transmission of the apparatus 20. Alternatively or in addition to configuring the phase shifters of the array, the control signal $26_1$ may comprise instructions to configure a power distributed to the array elements, i.e., to configure the setting of gain values in the antenna array.

Alternatively or in addition, the control signal 262 being a version or a part of the control signal 26, may instruct the apparatus 20 so as to write test patterns of signals to be transmitted, of spectra to be transmitted respectively, into the BB-IC. Alternatively or in addition, the control signal 262 may instruct the apparatus 20 such that the apparatus 20 changes a baseband system configuration including waveforms and the like. This may relate to different configurations of filters to be applied, to a bandwidth to be occupied with a signal or other baseband configurations.

Alternatively or in addition, a control signal 263 being a version or a part of the control signal 26, may instruct the apparatus 20 such that the apparatus 20 application independently provides a signal to be transmitted with the antenna array 12 to the baseband circuit 34b. Thus, a specific message may be fed directly to the BB-IC via the interface 38a without using the application layer 34a, i.e., without going with the message through the application process. Thus, in or between specific layers of the apparatus 20, specific commands that define or manipulate signals to be transmitted via the antenna array 12 may be inserted into the layer stack. Known test methods that switch between test modes are performed by indicating such a test mode, for example, as indicated by the arrow 36e. Such information is manipulated by the application process 34a which may lead to an unknown result, i.e., the behavior of the apparatus 20 might be unknown when using a signal insertion over the arrow 36e. In contrast hereto, the control signal 26 allows for directly controlling the apparatus 20 and/or specific components thereof and allows therefore for a precise test method.

As explained above, the control signal may also instruct the apparatus 20 to perform measurements and to report results of the measurements and/or information derived thereof. Using the interface 38c, the apparatus 20 may be configured to read or monitor the network using the antenna array 12, for example, reading I/Q samples in the time domain. Using the processor 32, the apparatus 20 may be configured to evaluate the samples and to include the results in a message to be transmitted to the measurement system.

A control signal 264 being a version or a part of the control signal 26 may instruct the apparatus 20 such that the apparatus 20 performs such I/Q measurements. Alternatively or in addition, a control signal 265 being a version or a part of the control signal 26 may instruct the apparatus 20 such that the apparatus 20 evaluates a baseband of the apparatus 30, i.e., a baseband information of signals received with the antenna array 12 and to include such information into an output signal. This may include, reading a channel status/state information (CSI), a channel quality indication (CQI) a modulation and coding scheme (MCS) level or the like. Alternatively or in addition, a control signal 266 being a version or a part of the control signal 26 may instruct the apparatus 20 such that the apparatus 20 reads or evaluates data and/or control channels and evaluates information contained therein. This may include evaluating commands transmitted to an application hardware layer, i.e., the layer 34a. Responsive to the control signals 264, 265 and 266, the apparatus 20 may be configured to transmit an output signal to the measurement system, for example, using the communication interface for receiving the control signal. I.e., the MCS may be bi-directional.

Furthermore, a set of control signals may form an associated message space (AMS) which may be designed such that interfacing with several or all available control interfaces at the DuT and all associated devices involved in the T&M procedures may be supported. This may include interfacing with the internal interfaces of the UEs such as DigRF of UEs in order to capture digitized raw signals between the RF-IC and the BB-IC or from provided interfaces inside the BB-IC, e.g., under the framework of ETSI RRS [5, 6, 7].

In other words, FIG. 2a shows an example of an UE in the role of DuT connected via the MCC and terminating at various control interface options supported by a UE allowing different kinds of messages to be exchanged enabling different levels of in-depth testing and measurement without bringing the device into a specific measurement lab.

FIG. 2b shows a schematic diagram illustrating a structure of an associated message space according to an embodiment. For example, a number of N control signals or messages may be transmitted to the DuT. Each message may comprise one or more parameters 27 that may indicate an action to be performed an/or details on a specific action. An action indicated may be, for example, to trigger actions; to synchronize timing, frequencies and/or procedures; to configure settings; to ask/request reports/measurements; to arrange or use features, e.g., encryption protocols; to request identification, authentication, traceability, but is not limited hereto.

The control signal, i.e., the selected message of the Associated Message Space, may be transmitted to one or more receivers/probes such as UEs. This allows for instructing the more than one receiver to perform coordinated actions. Such coordination may be used, for example, to coordinate elements involved in the Test and Measurement procedures. According to an embodiment, this may be used to orchestrate UEs to act as distributed sensing or probe nodes. For example, one or more UEs may be instructed to transmit and/or one or more UEs may be instructed to receive in the cell that is operated by the base station which may transit the control signal as broadcast signal or as individual signal. Thus, the measurement system may be implemented by the base station and/or the control signal may be adapted to configure a plurality of UEs to act as distributed probes for transmission, reception and/or both.

The AMS may thus go beyond the definition of messages in TS 37.320 [4] (radio measurement collection for minimization of drive tests (MDT) which is called MDT mode). Details on a specific action may be, for example, details on the encryption, an identification or other information relating to the authentication, a type of measurement to be performed and/or a time thereof or any other suitable information. Optionally, the AMS may define message types or classes that may be indicated by a field 29. The field 29 may, for example, indicate the action to be performed, allowing for a high degree of freedom in the AMS.

Messages in the AMS may include, but are not limited to, a beam forming index, pattern or sets of beamforming/precoding indices to be used in a consecutive manner; reference signals; signal strength for desired and undesired signal components; waveforms; time stamps; location or positioning information such as GPS that may be derived from GPS information or WiFi-fingerprinting information, orientation derived from gyroscope, radar sensor, a pressure sensor for measuring altitude, a position information derived at a base station using network-based positioning, a position information derived from other entities and/or any combination of the above such as derived from sensor fusion of several KPIs. Alternatively or in addition, the AMS may include a RAN and cell specific parameters, MCC specific parameters, a coordination of a plurality of probes, UEs and/or BS. Alternatively or in addition, the AMS may include a request to a specific procedure to be followed during the test, to RF configurations such as TRx diversity, selection or a multiplexing, a measurement information such as a channel state information (CSI), a partial CSI or a full CSI, respectively, to a time and/or I/Q samples. Alternatively or in addition, the AMS may include information related to a time session identifier, to a token or the like, for example, for recharging and billing mechanisms if supported by the RAN and/or needed by the T&M procedure. This may apply, for example, for specific tariffs that might include that UEs of the subscribers are agreed to be used for a number of measurements under certain conditions such as depending on a battery status. As described above, the UEs may be used as distributed sensors/receivers and/or transmitters in the network cell, i.e., the T&M procedure may relate to a test that is performed during operation of the cell and outside a measurement chamber.

FIG. 3a shows a schematic block diagram of an apparatus 30 according to an embodiment. The apparatus 30 may comprise a memory 42 which is configured to store the control signal 26 or information derived thereof such as specific instructions. Reception and storage of the control signal 26 may be performed during a first time interval by the apparatus 30, for example, a time interval during which a connection with a measurement system exists. During a second time interval, during which, for example, the direct communication with the measurement system is offline or closed, the apparatus 30 may be configured to read the control signal 26 from the memory 42 and to perform actions according to instructions contained in the control signal 26. For example, the respective instructions may be provided to the apparatus 30 which controls the antenna array 12, for example using the processor 32 and/or the layers 34a-c. The processor 32 may be configured, for example, to implement at last parts of the layers 34a-c described in connection with FIG. 2a. The apparatus 30 may be configured to generate and/or transmit an output signal 44 via the communication interface 24. The output signal 44 may comprise information described in connection with FIG. 2a as being provided by the apparatus 20 responsive to the control signals 264, 265 and/or 266.

Alternatively or in addition, the apparatus 30 may be configured to implement a security mechanism for communication performed with the communication interface 24. Such a security mechanism may comprise an encryption and/or a decryption of the control signal 26 and/or the output signal 44. This may provide for an advantage in a later real environment of the apparatus 30. For example, a product that is sold may be used as DuT in a measurement laboratory as well as a product for selling it to a customer, e.g., in a shop or after fabricating it. Such is, for example, apparatus 30. Thus, the communication interface 24 may provide for a communication interface with a measurement system that is configured to directly control the behavior of the apparatus 30. The communication interface 24 is therefore possibly included in products that are sold. Implementing security mechanisms for the signals 26 and/or 44 transmitted over the communication interface 24 may allow securing communication performed thereover and may thus allow prevention of an abuse of the apparatus 30.

Figure 3B:
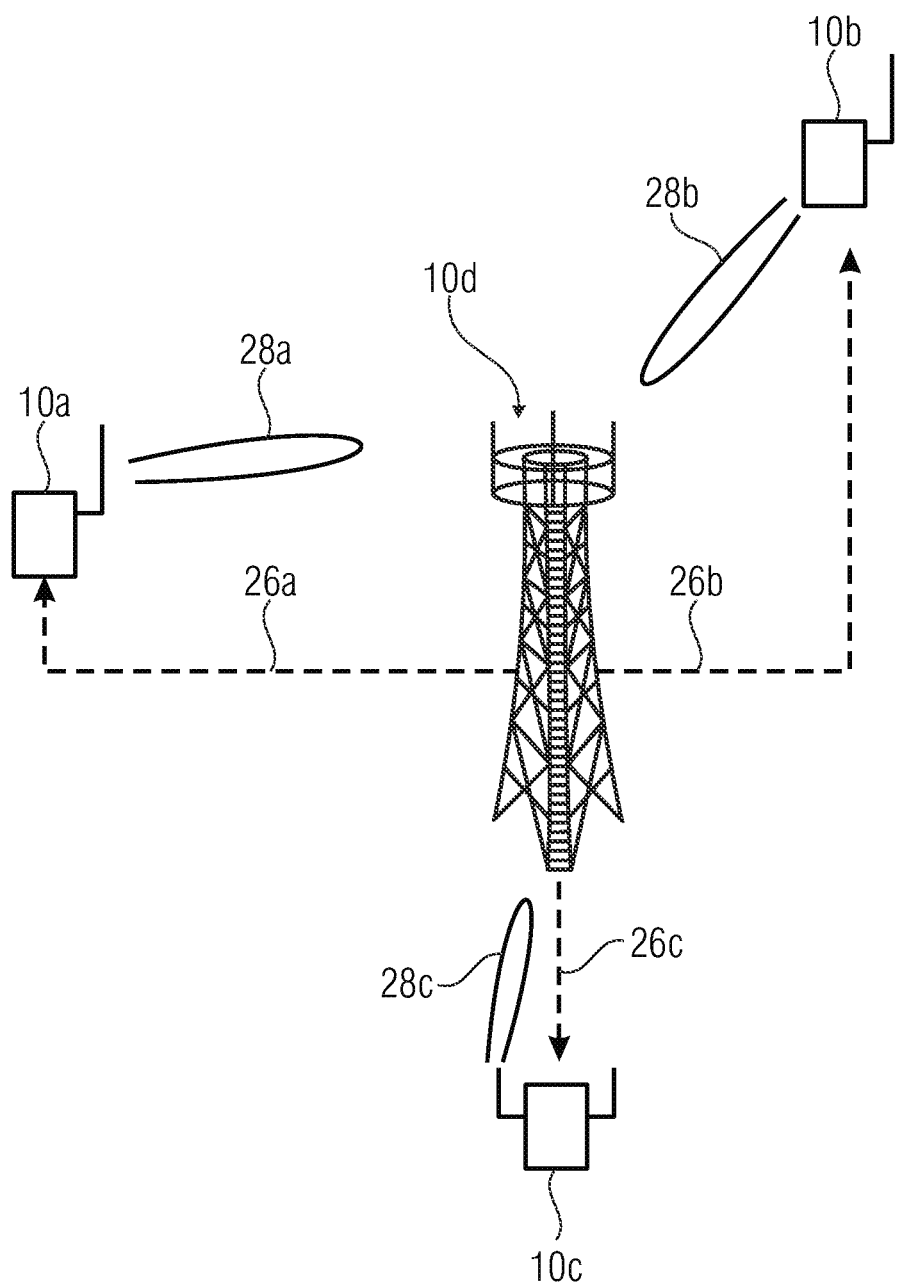
FIG. 3b shows schematic diagram of a plurality of apparatus according to an embodiment being operated by another apparatus according to an embodiment.

By non-limiting example only, FIG. 3b shows an arrangement of an apparatus 10a and an apparatus 10b being both a UE. Another apparatus 10c may be an IoT device. Apparatus 10a, 10b and 10c may be operated by another apparatus 10d being a base station. The base station 10d may transmit controls signals 26a, 26b and 26c to the apparatus 10a, 10b and 10c, e.g., using individual signals or a broadcast signal. Thus, the apparatus 10d may coordinate a distributed test utilizing some or all of the other nodes. According to other embodiments any other apparatus 10a, 10b, 10c or possibly an external apparatus may coordinate and/or trigger the test as will be described later. In this context security mechanisms described herein may be implemented so as to ensure a correct operation and/or to prevent a misuse.

The MCC may be used for controlling operation of a DuT, e.g., for controlling it to form the beam 28. The MCC, i.e., the possibility to transmit the control signal 26 to an apparatus may also be used to transmit a plurality of same or different control signals to a plurality of apparatus at a same time or time interval, i.e., a plurality of apparatus may be orchestrated using the MCC. For example, a plurality of apparatus 10a, 10b and/or 10c may commonly be instructed to perform an action such as to form a respective beam 28a-c into a direction towards a specific position. Thus, the specific position may be hit or covered by multiple beams being transmitted by the plurality of apparatus.

At the specific position, a measurement may be performed that evaluates reception parameters such as reception quality, bandwidth, coverage by the beams or the like. For example, at the specific position, the base station 10d may be located. By instructing a plurality of UE 10a and 10b to transmit a signal or beam towards the base station 10d, the base station 10d may evaluate if it may receive the signals properly or if a re-adjustment has to be performed, e.g., after a storm having re-located one or more antennas of the base station. The control signals 26a-c may be transmitted by the base station 10d or a different node. Thus, the apparatus 10d such as a base station may be configured to orchestrate operation of a plurality of UEs for performing a distributed test.

Alternatively or in addition, the control signals 26a-c may be used to instruct the apparatus to perform measurements for evaluating of the reception at the apparatus as described in connection with the control signals 264 to 266 in FIG. 2. I.e., the apparatus 10a, 10b and/or 10c may be instructed via the MCC to perform a test. The DuT 10a, 10b, 10c respectively may report the results of the measurements, for example, to the base station 10d, a different node or a measurement system using the regular communication channel and/or using the MCC. Similar to transmitting the control signal 26a, 26b and/or 26c to a plurality of apparatus so as to commonly transmit a beam, a plurality of apparatus may be instructed to perform measurements, wherein both options may be performed at a same time, i.e., a plurality of apparatus may be instructed to transmit and a plurality of apparatus may be configured to receive. This may allow for testing the behavior in complex scenarios, e.g., using one or more apparatus being an IoT device. Such a test ay be triggered by the base station 10d, but may also be triggered externally, for example, when directly or indirectly transmitting a respective signal to the base station 10d which may be done, by non-limiting example only, using the MCC.

Thus, the MCC may be used to instruct the DuT 10a, 10b, 10c and possibly 10d individually or commonly and probably orchestrated for a specific behavior in uplink (transmitting the beam 28) or in downlink (performing measurements). In other words, the measurement control channel and/or the control signal may be used to set the apparatus 10a, 10b, 10 or 10d into a receive (Rx) or transmit (Tx) mode for further actions to be performed. It is to be noted that the naming of DuT is used herein for discrimination purposes without limiting the scope of the embodiments described herein. For example, in the above scenario, the base station may be referred to as DuT as a test is performed with respect to the base station's position.

According to embodiments, the MCC may be used for selection of a suitable service provider. For example, different base stations being operated by different providers may be in range of the apparatus. By using the MCC, for example, the apparatus may trigger a download test by transmitting a respective control signal to the base stations and evaluates the most appropriate base station by comparing the results.

Alternatively or in addition, the apparatus 10a, 10b, 10c and/or 10d may be triggered via the MCC to cause such a test. Alternatively or in addition, the network may test itself. For example, the base station 10d may trigger the apparatus 10a, 10b and/or 10c to receive data and to report the amount or quality of the received data so as to evaluate a channel quality. Thus, also the base station 10d (apparatus receiving the control signal) may be set into a test mode by the user equipment 10a, 10b and/or 10c (apparatus sending the control signal).

When referring again to FIG. 1, it may be noted, that an apparatus according to embodiments may be an apparatus whose radiation/reception shall be tested with external probes. The probes may be part of the apparatus, when instructing other nodes to transmit and/or part of a measurement system implemented by laboratory devices or devices operated in consumer's use (UEs), when instructed to receive information from the DuT and to feedback results. Simplified, the DuT may be monitored internally or externally.

Figure 4:
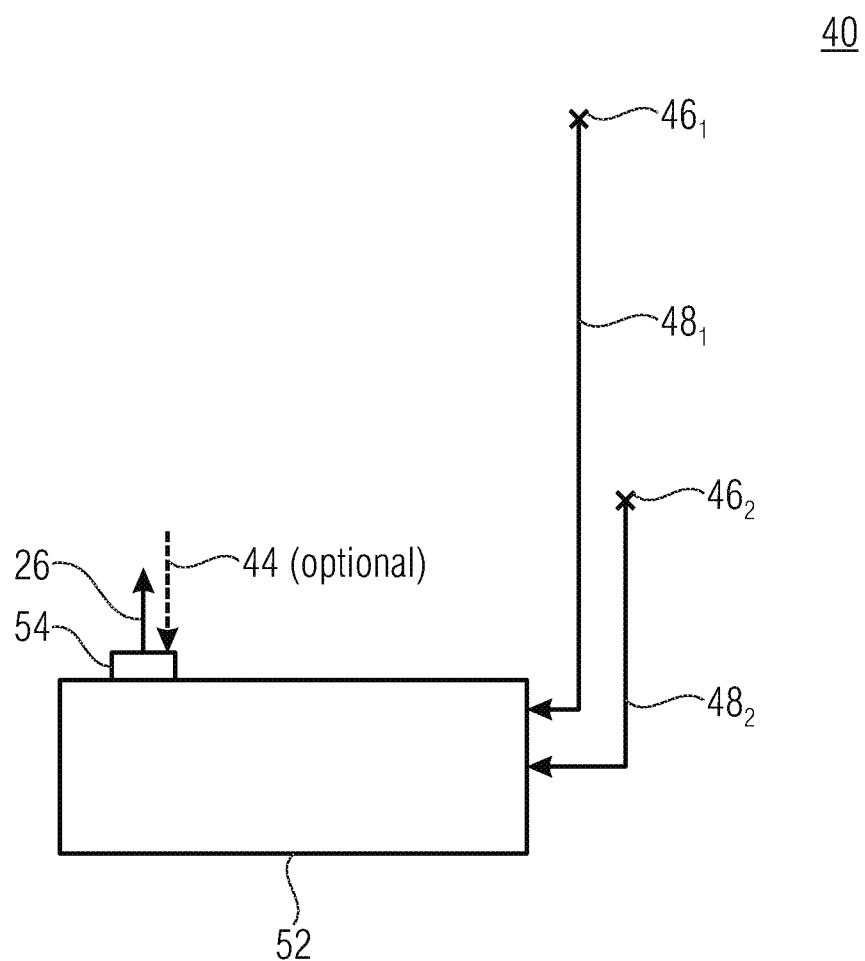
FIG. 4 shows a schematic block diagram of a measurement system according to an embodiment comprising a plurality of sensors.
Figure 9B:
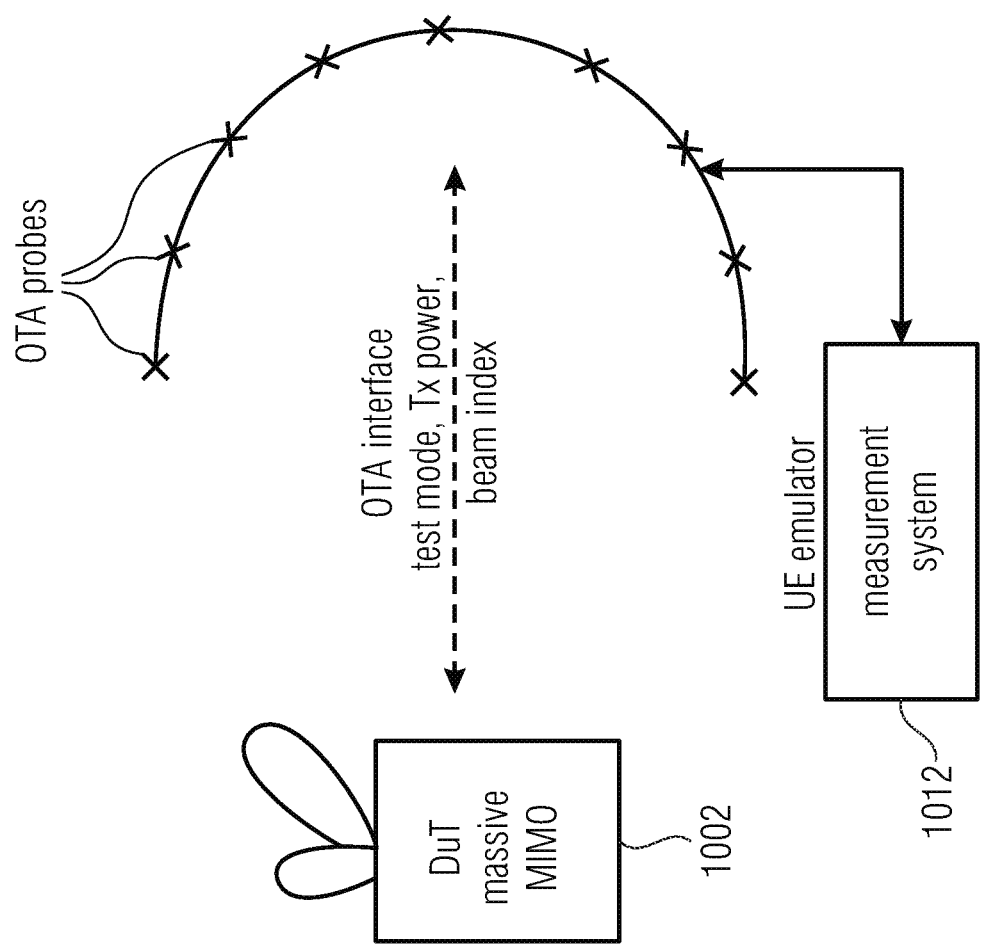
FIG. 9b shows a schematic diagram illustrating a test and measurement procedure according to 3GPP TR 37.976.

FIG. 4 shows a schematic block diagram of a measurement system 40 according to an embodiment. The measurement system 40 comprises a plurality of sensors $46_1$ and/or $46_2$ configured to receive the radio frequency beam 28 from an apparatus described herein, for example, the apparatus 10, 20 and/or 30. The sensors $46_1$ and/or $46_2$ may be, for example, OTA probes that are described in connection with FIG. 9a and/or FIG. 9b. Although only two sensors $46_1$ and $46_2$ are illustrated, the measurement system 40 may comprise a different number of sensors, for example, three or more, four or more, ten or more and even 20 or more.

The sensors $46_1$ and $46_2$ are configured to provide sensor signals $48_1$, $48_2$, respectively, based on the received radio frequency beam.

The measurement system 40 comprises a control unit 52 that is configured to receive the sensor signals $48_1$ and/or $48_2$ and is configured to transmit the control signal 26 to the apparatus. Although the sensor signals $48_1$ and $48_2$ are illustrated as two separate signals, there may exist cases in which the sensors $46_1$ and $46_2$ are connected to each other to a sensor array, wherein the formed sensor array is configured to provide for a common sensor signal for the control unit 52 such that only a single sensor signal is transmitted. The sensors $46_1$ and/or $46_2$ may be implemented or may comprise, for example, by an element configured to transmit and/or receive electromagnetic energy at radio frequencies such as antennas. The control unit 52 may control the antennas so as to control the measurement setup. This may include the transmission of agreed signals and reception with the measurement sensors/antennas. Sensors $46_1$ and/or $46_2$ implemented as antennas may result that the control unit and the apparatus are the same or separate apparatus.

The measurement system 40 may be configured to transmit a plurality of control signals to a plurality of receiving apparatus. For example, a communication interface 54 of the measurement system of 40 being configured to provide for the control signal 26 may be a wireless interface and/or may be a network interface. Based thereon, one or even a plurality of control signals 26 may be directed to a plurality of apparatus such that the measurement system 40 may be configured to test a plurality of apparatus at a same time. The control unit 52 may configured to transmit at least one control signal 26 to a plurality of apparatus. The one or plurality of control signals may contain information that is adapted to instruct the respective receiver to perform actions within a distributed test and/or to act, during the distributed test, as a receiver or transmitter. Thus, by use of the one or the plurality of control signals a probably corresponding plurality of apparatus may be orchestrated to commonly perform a test. Orchestrated may relate to showing a coordinated behavior that may be coordinated by the measurement system. As indicated above, the measurement system may also be a base station operating a wireless communication network cell, wherein the DuT may be UEs and/or IoT devices operated by the base station.

The interface 54 may be configured to receive the output signal 44 in an optional case.

The output signal 44 may comprise information relating to input samples (I/Q samples) received by the apparatus that received the control signal 26. The output signal 44 may alternatively or in addition comprise information related to an evaluation of a baseband of the apparatus and/or information related to an evaluation of commands transmitted to an application hardware of the apparatus.

In the following, some more details are disclosed in connection with the coordination of distributed tests.

Figure 5:
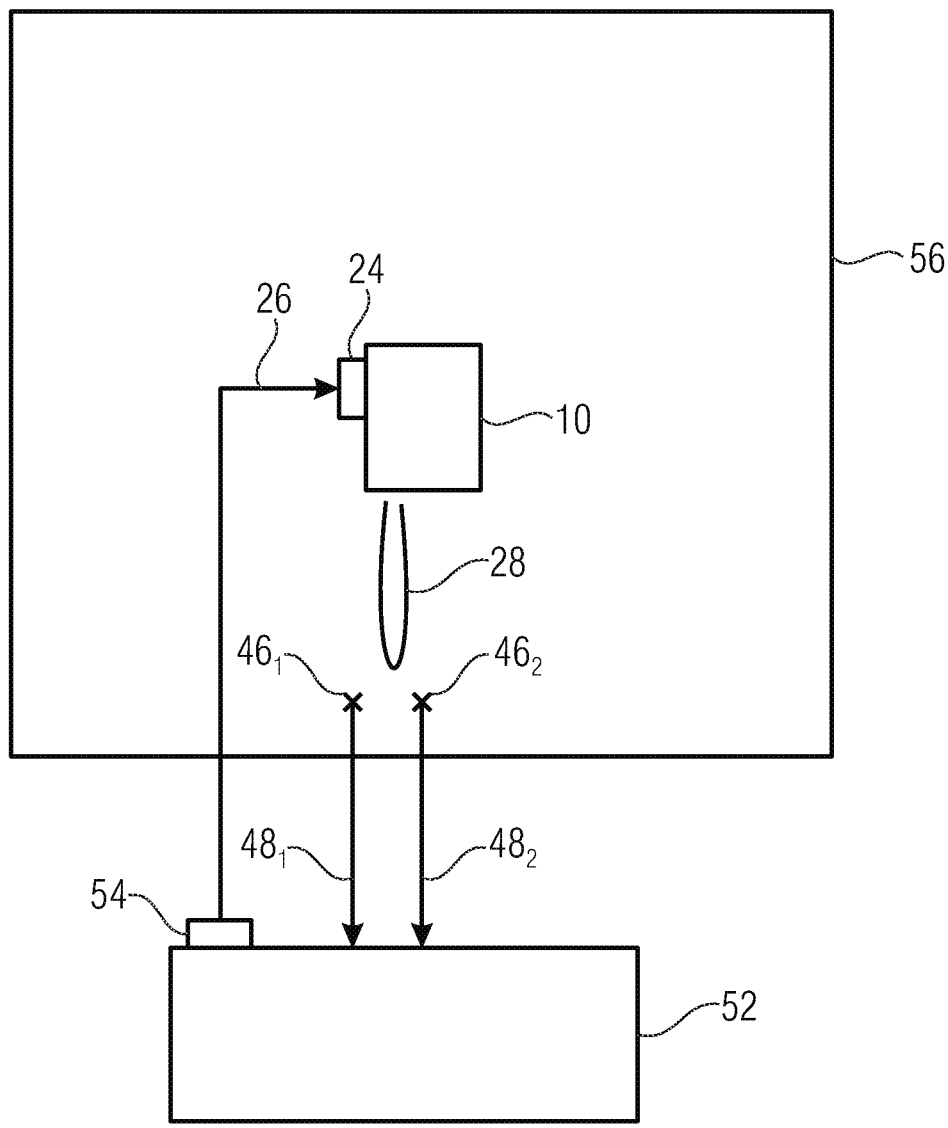
FIG. 5 shows a schematic block diagram of a measurement system according to an embodiment, comprising a measurement chamber.

FIG. 5 shows a schematic block diagram of a measurement system 50 according to an embodiment, comprising a measurement chamber 56. The measurement chamber 56 may comprise the sensors $46_1$ and/or $46_2$ that are connected to the control unit 52. The chamber 56 may be configured to host the DuT, for example, the apparatus 10, 20 and/or 30. Alternatively the chamber 56 may be configured to host a plurality of apparatus, i.e., a plurality of apparatus may be arranged inside the chamber 56. The measurement chamber 56 may be an anechoic chamber but may alternatively be a different chamber. An anechoic chamber may provide for a mainly passive absorption and may itself not necessarily an active control. Control or operation of the measurement chamber may thus alternatively or in addition relate to an orchestration of some or all sensors and transmitters inside the measurement chamber. Using the interfaces 54 and 24, the measurement control channel may be implemented. The embodiments described herein relate to controlling an apparatus using a control signal. This may allow for obtaining situations that are different from predetermined test cases. Such predetermined test cases may be in accordance with a communication standard such as Long Term Evolution (LTE) according to which the apparatus to be tested is configured to operate in a wireless communication network. Alternatively or in addition, antenna array performances measurements may be done with specific signals which are later not used in the actual use but better suited for accurate measurements.

In other words, an idea of the embodiments described herein is to define a generic control channel, which allows specific air interface measurements to be performed over the air (OTA) between elements of a wireless network. Such a measurement control channel (MCC) may be realized in various forms and may use an associated message space (AMS), designed so that it can support current and future OTA test and measurement procedures (T&M) in an appropriate and efficient manner. For such T&M procedures, a DuT and a measurement equipment and/or a measurement system and/or measurement environment may be enabled to communicate with each other and perform reproducible measure steps and procedures. Ideally, this is implemented vendor-independent and in a standardized way.

For such procedures, a suitable communication channel may be provided to control the measurement procedures, which will be called a Measurement Control Channel (MCC). A suitable Associated Message Space (AMS) may be designed such that current and future T&M procedures may be realized in an appropriate and efficient manner. Embodiments provide for an integrated combination of the two parts in one holistic solution. Current discussions reflected in 3GPP TR 37.842 [1], discuss OAT test methods of Active Antenna Systems. TR 37.842 assumes manual settings of parameters for the base station. Furthermore, TS 36.141 [3] discloses some details of current base station conformance testing but is not defining a communication protocol for test and measurement proposals. Therefore, in order to provide the means to control e.g., base stations, externally or over the air, for example, using a measurement system, a standardized communication for test and measurement purposes is provided.

In order to control a base station from a type of user equipment emulator, embodiments described herein define the MCC that allows directly controlling at least parts of the apparatus. Embodiments provide extension and generalization of interfaces in the context of TR 37.842 and TR 37.976 to add further capabilities to control and perform OTA T&M and in-field optimization (IFO) for wireless devices using multiple or massive numbers of antennas. In addition to the current parameters on the existing interfaces such as mode of test (test cases), Tx power, waveform, etc., embodiments add a flexible message space designed such that current and future T&M procedures can be supported. Therefore, further extensions of TR 37.976 may be supported by defining a new control interface to support, e.g., the control of a base station from a UE emulator in addition to controlling a UE by a BS emulator. The described embodiments therefore comprise the component of the MCC and of the AMS.

Figure 6A:
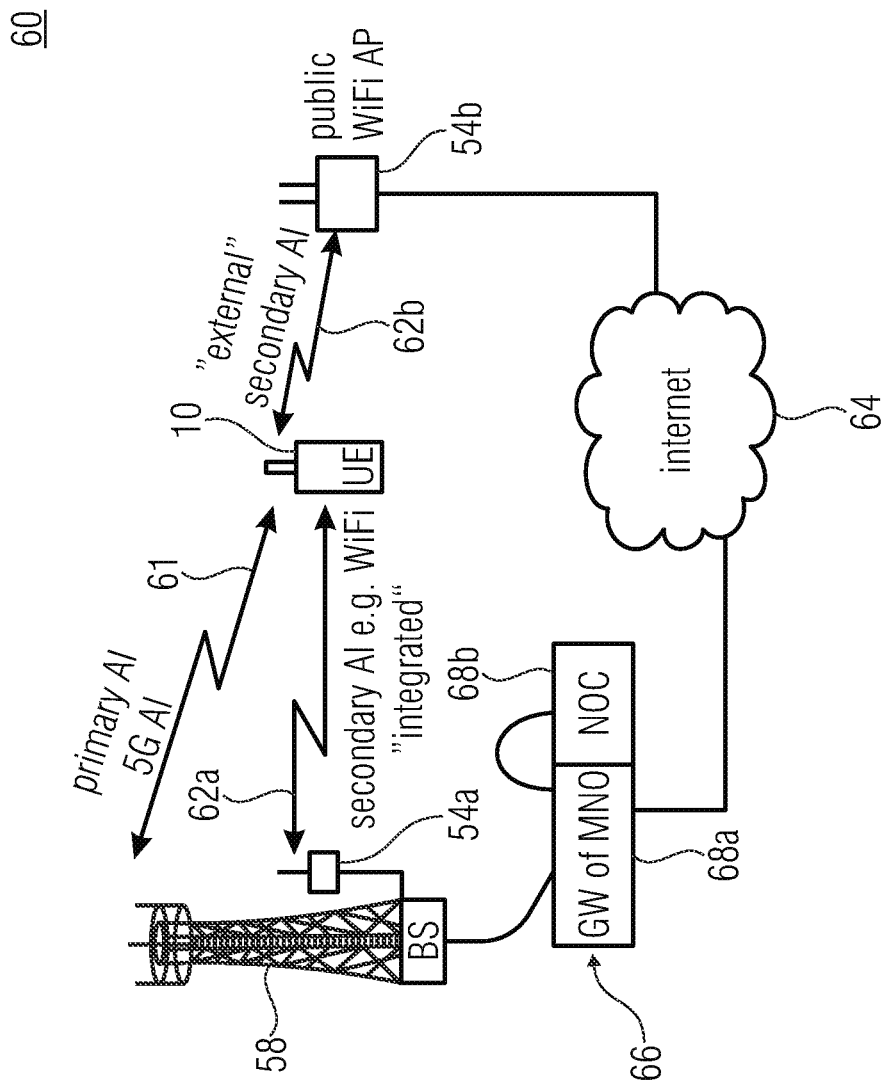
FIG. 6a shows a schematic block diagram of a measurement system according to an embodiment, being a system operational for operating a user equipment.

FIG. 6a shows a schematic block diagram of a measurement system 60 according to an embodiment. The measurement system 60 may be a system operational for operating a user equipment, possibly the apparatus 10, 20 and/or 30, for example, in a wireless network such as a 5G network. The apparatus 10 may therefore comprise a primary Air Interface (AI) that is operational in the 5G communications scheme. A base station 58 may comprise a corresponding 5G AI to communicate with the apparatus 10 over the 5G network. The base station may be, for example an apparatus 10, 20 or 30 and may be referred to as a coordinator node. The 5G AI may be referred to as a primary AI or channel 61. For example, a plurality of antennas of the base station 58 of the primary AI may serve as sensors used for measuring a signal received from the apparatus 10. The base station 58 may comprise a communication interface 54a configured to provide the MCC 62a between the base station 58 and the apparatus 10. This may be referred to as a secondary AI that may be integrated in terms of being an integrated function of the base station 58. The secondary AI 54a may operate, for example, according to a WiFi standard or another communication protocol such as according to a 2G, 3G or 4G standard or the like.

Alternatively or in addition, the measurement system 60 may comprise a different communication interface 54b, for example, configured to communicate with a public access point, operating according to a communication protocol, such as by non-limiting example only WiFi. This may be referred to as an external secondary AI as being implemented aside from the base station 58 operating the apparatus 10. The communication interface 54b may be connected with the base station 58 over a network 64 such as the internet, being also connected to a control unit 66 that may operate according to the description made in connection with the control unit 52. The control unit may comprise an instance 68a providing for a gateway of the mobile network operator (GW of MNO) being connected to an instance 68b, for example, a network operations center (NOC) such that the base station 58 is connected via the control unit 66 and the network 64 with the communication interface 54b allowing establishment of an MCC 62b between the apparatus 10 and the base station 58. Although being described as being executed by the control unit 66, the functionality described for the control unit 52 may also be performed at the base station 58 and/or at another node connected to the network 64.

In other words, an establishment of an MCC over a secondary/auxiliary AI is illustrated on the left-hand side of FIG. 6a as an integrated version thereof, within the radio access network (RAN) under test and on the right-hand side of FIG. 6a as an external version thereof since some parts of the signal flow leaves the RAN under the control of the NOC. In the right-hand side case via the public internet, the MCC 62b may have to communicate via instances such as the gateway 68a and the network operations center 68b to be able to address, for example, a specific base station. The MCC 62a and 62b may be established simultaneously and/or as an alternative with respect to each other.

The MCC may have properties according to the following principles: it may be separated from the primary AI and the Radio Access Network under test it may be realized by a wireless interface. In such a case, the AI or RAN under test may be considered as a primary AI where the actual measurement is performed, while the MCC may be operated on a secondary/auxiliary AI, logically and/or physically separated using independent radio resources. In this way, interference between the MCC and the actual performance measurement OTA may be avoided and the amount of protocol overhead, e.g., detailed measurement reports, may scale independently from the capabilities of the primary AI under test. The choice of the auxiliary AI for the MCC may be made dependent on an availability and/or an appropriate capacity, reliability and latency of the auxiliary AI. In order to improve the reliability of the control channel, specific fail-proof protocol sequences may be embedded in to the communication protocol of the MCC. This may involve the commonly used levels of reliability protection mechanisms, cyclic redundancy checks (CRC). These shall be chosen adaptively depending on the capabilities of the auxiliary AI, a combination of a few and/or the actual wireless transmission conditions available, e.g., control from deep indoor to a cellular network surrounding buildings. I.e., the apparatus and/or the measurement system may be configured to encode the control signal 26 and/or to decode it. For further optimization of the MCC, data can be compressed and stored on the DuT and transported to the measurement system at a later stage. This may allow optimization of the measurement system and may allow tests even if the connectivity between the DuT and measurement system is temporarily unavailable. The MCC may use any available communication connection between the measurement system and the DuT. If several alternative options are available, then preferences may be defined as any selection or combination of a) a best effective wireless connectivity, available data rate, redundancy/reliability, security of a link and/or b) a shortest effective link via multiple network elements in the network, e.g., via the public internet passing gateways (GW) of the mobile network operator (MNO) etc., and/or c) an evolved protocol layer to be passed and message flows resulting in synchronized/unsynchronized message (packet) delivery.

A latency resilient, robust, interruption and packet loss-tolerant communication protocol including, e.g., buffering and/or storing of data and samples may be used. Security levels provided by the MCC may also be able to exploit authentication mechanisms within the AI/RAN under test end-to-end (e2e) between the measurement device/system and the DuT. Alternatively or in addition, multi-radio access techniques (RAT) interworking mechanisms may be exploited, such as defined, e.g., in 3GPP-non-3GPP interworking. Alternatively or in addition, a trusted multicast to other entities such as Network Optimization Entities may be supported. Alternatively or in addition, a certified tunneling through various security zones may be supported, e.g., through third parties, including lawful intersection, allowing for an access of network elements for T&M proposals after authentication. Alternatively or in addition, a cyphering of measurement data using state-of-the-art (SOTA) encryption/decryption algorithms such as a public key infrastructure (PKI) may be supported.

The above exemplarily sketched control interface interfaces may allow, amongst other things, the following tests: read of I/Q samples directly behind the RF-IC interface. Furthermore, specific sounding sequences may be uploaded into a memory/buffer to be emptied at a specific trigger in order to allow a probing of the DuT, e.g., when receiving a respective control command.

The embodiments described herein allow flexibly establishing a measurement communication channel between a DuT and a measurement set up independent from the AI/RAN under test. Embodiments further allow generation or implementation of a flexible interface to various communication entry points/levels on the DuT side and the measurement device/environment. Furthermore, embodiments allow an extension of the MCC to be carried across multiple network domains, protocol layers and/or security zones. An Associated Message Space is provided to support actual and future T&M procedures. Embodiments allow control of any network device under this framework, no matter if this is a base station, a user equipment, a forwarding element (relay) or any other node/device used in the first network transmitting/receiving signal over the air.

The measurement system 60 may be implemented such that it is realized in a wireless communication network cell operated by the base station 58. A plurality of apparatus (UE and/or IoT) may be operated in the wireless communication network cell by the base station 58. The base station may comprise a control unit such as the control unit 52 and/or 66 and may be configured to transmit at least one control signal 26 to the plurality of UE so as to orchestrate a test within the wireless communication network cell performed commonly by the plurality of apparatus. The test may be, for example, a download test, a test for testing channel fading parameters and/or a test for testing the position/orientation of the base station as described herein.

The base station 58 may but is not required to be the base station to which the UE 10 is associated for regular network operation which is a base station of the service provider. The apparatus may be subscribed to a different service provider which may include that regular operation is normally coordinated by a different base station of the different service provider to which the UE is associated. For performing the test, i.e., for using the second spatial electromagnetic radiation characteristic, the base station may transmit the control signal using the MCC 62a and/or 62b. This may allow the UE to switch from the subscribed service provider to the other service provider and to be part of a test of the different service provider.

For example, the apparatus 10 may be subscribed to a list indicating a set of apparatus that have agreed (possibly by rewarding the user) to be used during a coordinated test. Such a coordinated test may be coordinated or orchestrated in-time or in real-time. Such a real-time test may consume a high amount of data to be transmitted when instructing a plurality of nodes. According to embodiments, pre-scheduled tests are implemented. The coordinating node, e.g., the base station or a different node triggering the test, may transmit control signals comprising information indicating instructions to execute an action at a time indicated in the control signal, for example such as 2 am in the night. The action may be any action described herein, for example, performing a dedicated measurement. The apparatus may store this information and may execute the action at the indicated time. Thus, the data may be transmitted over a long time previous to performing the test and thus using a low bitrate. This may further allow to send the control signal to devices that are currently unavailable, i.e., when they are available later but before the scheduled test. When executing the action, other probably user-triggered actions may remain unconsidered during the test. The actions of the test may therefore override other modes of operation at the scheduled point of time of action. Alternatively or in addition, an apparatus 20 and/or 30 may be used or arranged.

The coordinator node comprising the control unit may be configured to transmit one or more control signal(s) (26) to the plurality of apparatus so as to orchestrate the test within the wireless communication network cell performed commonly by the plurality of apparatus. In some embodiments, it may be sufficient to use only a subset of available apparatus/UE available, for example, only those having specific technical properties or have subtracted the lowest reward for a user providing his or her UE for the test. The coordinator node may be configured to select a subset of the plurality of apparatus so as to participate during the test and to select other apparatus of the plurality of apparatus to not participate during the test. I.e., only those apparatus are addressed with a dedicated or the common control signal that are selected by the coordinator. As mentioned above, the coordinator node may be a base station but may also be a different entity such as a UE or a further, possibly external, node The apparatus may therefore store to perform the test as indicated, i.e., the apparatus may be configured to receive the control signal (26) and to store information derived thereof, the information containing instructions to execute an action at a time indicated in the control signal, wherein the apparatus is configured execute the action at the indicated time.

The apparatus may transmit a signal to the coordinator such as an acknowledgement.

There may occur situations that may prevent the apparatus participating the pre-scheduled test. For example, the apparatus may run out of battery, may be switched off or in flight mode or may be moved out of range. The apparatus may be configured to transmit a response signal to a transmitter of the control signal. Such a response signal may indicate that the stored pre-scheduled action to be executed will not be executed or is unlikely to be executed. For example, when moving out of range for a longer time, probably with a plane, it may be sure that the apparatus is not available for the test. According to other examples, battery may be low or an important call may be expected such that it may be unlikely but still possible to attend the test. The response signal may be transmitted, for example, responsive to a user command, e.g., using an App on the UE. Optionally, the apparatus may be configured to automatically transmit the response signal after having received instructions to change operation in the network and before changing the operation in the network. This may include, by non-limiting example, that when being switched off, switched into flight mode, into "Do not disturb", running out of battery or the like, an automatic response signal is sent by the apparatus to the coordinator so as to indicate that it is unlikely that the UE will be available for the test or at least that is possible that the node will not attend.

Responsive to the response signal received, the coordinator node may be configured to re-coordinate the test responsive.

Furthermore, the apparatus may be configured to determine a return into operation in the network as before to the happened change. For example, the battery may be charged, the flight mode may be switched off or the apparatus may return into the network cell. The apparatus may, manually or advantageously automatically transmit a notification signal to the coordinator indicating that the action to be executed will be executed. This may allow for a further re-coordinating or re-scheduling of the test at the coordinator.

As indicated above, the coordinator may select specific apparatus to participate the test. The criteria may be arbitrary such as battery level, technical equipment, or costs (money or data) or the like. To ensure at one or both sides (UE and coordinator) that the correct node is transmitting or receiving the control signal, a database may be accessible for the coordinator, for example, locally or distributed. The database may contain information about the entity such as a software key used at the UE, a hardware key used at the UE, a serial number or at least a component of the UE, a MAC-ID of the UE and/or a Transceiver-ID of the UE. Such information may be used to authenticate the coordinator for the UE, the UE for the coordinator and/or a specific component to be addressed. For example, a node may be identified by more than one of the above listed information and/or by further information. By using an identifier relating to a specific component of the other node, e.g., the transmitter of the UE, information may be transported that indicates which transmitter-IC is requested to perform an action.

Furthermore, by monitoring the information with other data such as a position, a misuse may be prevented that might occur when a node acts like a coordinator/base station although not being a reliable node, or a UE faking other user. Thus, an apparatus according to embodiments may be configured to perform authentication of the transmitter of the control signal by use of at least one of a software key, a hardware key, a serial number of a part of the apparatus, e.g., an Application Specific Integrated Circuit (ASIC) and/or a Field Programmable Gate Array (FPGA), a MAC-ID and a Transceiver-ID contained in the control signal and may use the second spatial electromagnetic radiation characteristic only if the authentication is successful. The apparatus may be configured to determine an action to be performed when using the second spatial electromagnetic radiation characteristic based on the use of at least one of a software key, a hardware key, a serial number, a MAC-ID and a Transceiver-ID by associating the information with a component of the apparatus to be used for using the second spatial electromagnetic radiation characteristic. In other words, a mechanism for authentication may comprise a software key, hardware key coming from a crypto chip, a serial number from FPGA/ASIC, a MAC-ID, a Transceiver ID (usually used against base band chip), especially if the apparatus carries no SIM card so as to allow authentication of UE. The DuT may ensure that the other end is authenticated. Accordingly, authentication may be approved by both ends. The authentication procedure may work against some and/or any layer of processing chain, i.e., it may address some layers, see for example, FIG. 2a, independently from other layers.

Using information different from a SIM (Subscriber Identity Module) Identifier allows using an apparatus that is configured to operate without a SIM-card in a wireless communication network as embodiments.

In other words, pre-scheduled OTA may be orchestrated. When OTA actions are prescheduled, then these actions may override other modes of operation at the scheduled point of time of action. Alternatively or in addition, an early warning (response signal) may go back to the OTA measurements orchestrator via the MCC using signals from AMS in order to reschedule/reconfigure the OTA measurement and/or reconfigure other options for actions not to interfere with the intended OTA measurements. According to embodiments, the test or measurements described herein may be performed/run simultaneously in CA (carrier aggregation) or in another radio access technology (RAT). Other actions around the target time for OTA measurements may comprise, for example, a rescheduling, preparation or reconfiguring of one or more apparatus in order to keep a "window of action" open for orchestrated OTA measurements.

Figure 6B:
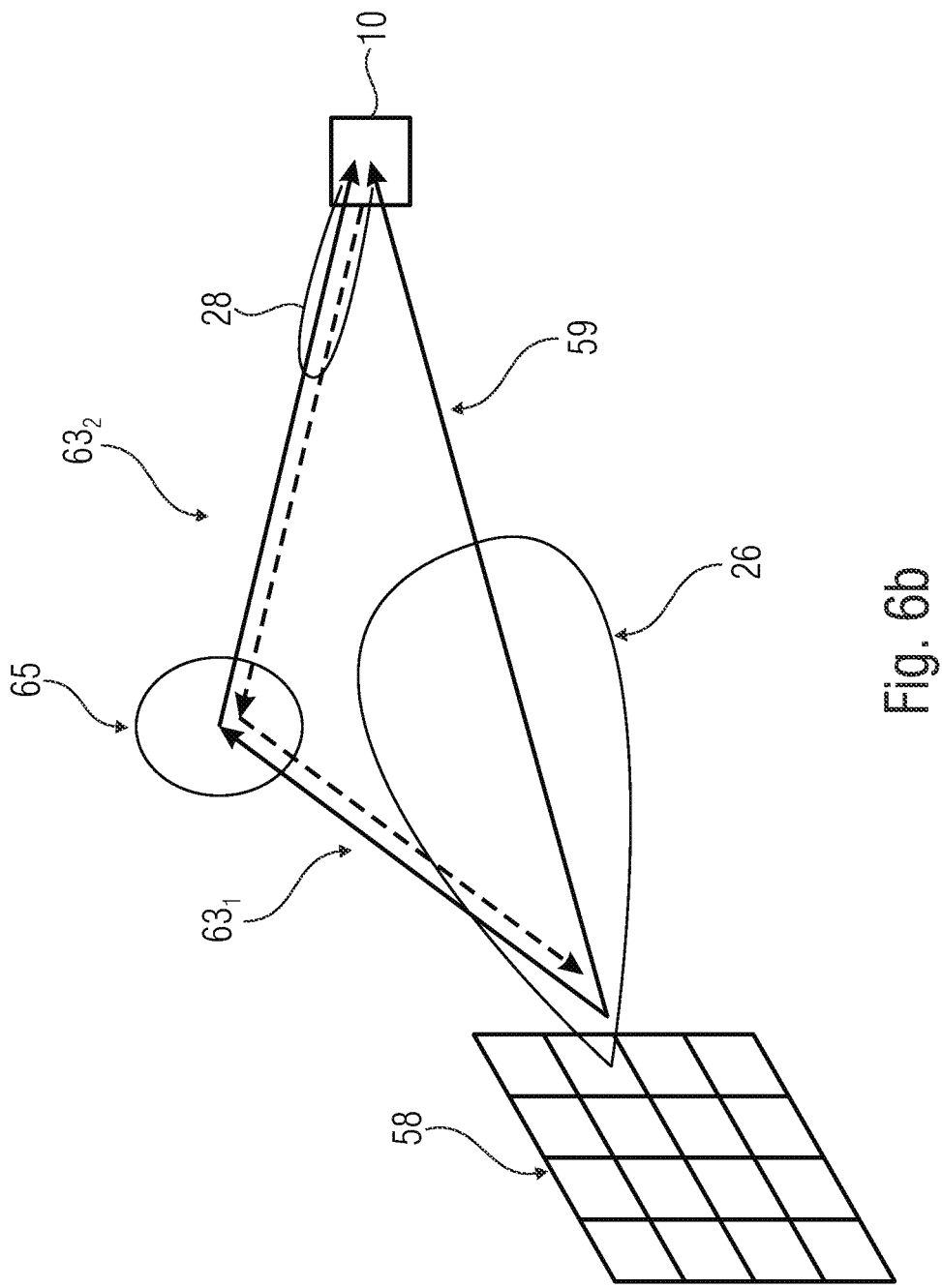
FIG. 6b shows a schematic block diagram of a measurement system according to an embodiment in which a node is instructed to exclude a Line of Sight path from beamforming.

FIG. 6b shows a schematic block diagram of a measurement system 60' according to an embodiment. For illustrating the embodiment, a scenario is assumed in which the coordinated test has revealed information that between the base station 58 and another apparatus 10 a Line of Sigh (LoS) Path 59 is present. Furthermore, it is known that at least one non-LoS (nLoS) Path 63 is present comprising sections $63_1$ and $63_2$ between the base station 58 and a reflecting structure or a reflector cluster 65, between the reflector structure 65 and the apparatus 10 respectively. The reflecting structure may be a relay, a passive structure, e.g., metal or other reflecting elements, e.g., buildings. LoS paths may comprise a high SNR/SINR when compared to nLoS paths, for example higher of about 20 dB, 30 dB or even 40 dB. Based on a limited dynamic of hardware and/or software some LoS paths may prevent nLoS paths from being considered as their low SNR/SINR might be considered as noise. The coordinator node (base station 58) may be configured to include information into the control signal 26 transmitted, the information indicating that a radiation characteristic of the apparatus 10 is to be adapted so as to exclude the Line of Sight path 59 between from the radiation characteristic and/or to direct the beam along the nLoS path 63, the section $63_2$ respectively, instead.

This may allow using a high dynamic and a high amount of information, especially when a plurality of nLoS paths is present that may be evaluated, for example for evaluating phase shifts or the like. The apparatus 10 may thus be configured to use the spatial electromagnetic radiation characteristic so as to exclude the LoS path from the radiation pattern or to at least use a different polarization along that direction. Alternatively or in addition, the coordinator 58 may also prevent a transmission along a direction of the LoS path 59. For such a behavior or coordination in a cell, a distributed test according to embodiments may be used, i.e. the DuT (coordinator) may have knowledge what properties the probes (UE) have, simplified what they are doing.

In other words, the coordination may refer to a transmit case and/or a reception use case. In addition, both transmission and reception may be used for time synchronization for measurement in both uplink and downlink, for example, by scheduling different actions to different nodes in a test, some actions related to uplink and others to downlink. In a scenario, where one or more of the transmit sources comprise antenna arrays and are capable of creating spatial beams, these could be pointed or aligned or directed towards reflecting clusters in situ between the two ends of the radio link. An example: if LoS is obscured/excluded and energy is misdirected towards one or more clusters, the measurement resolution in the direction of nLoS may be increased significantly.

FIG. 7 shows a schematic flow chart of a message 700 for operating an apparatus such as the apparatus 10, 20 or 30. The apparatus comprises a plurality of antennas and comprises a communication interface for receiving a control signal. The apparatus is configured to form a first radio frequency beam in accordance with a predetermined test case independent from the control signal, using the antenna array. The method 700 comprises a step 710 in which a second spatial electromagnetic radiation characteristic is formed being different from the predetermined test case and responsive to instructions contained in the control signal.

FIG. 8 shows a schematic flowchart of a method 800 for operating a measurement system such as the measurement system 40, 50 or 60. The measurement system comprises a plurality of sensors configured to receive a radio frequency beam from an apparatus and to provide a sensor signal based on the received radio frequency beam. The method comprises a step 810 in which the sensor signal is received. In a step 820, a control signal is transmitted to the apparatus such that the control signal comprises instructions to form a spatial electromagnetic radiation characteristic different from a predetermined test case.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] 3GPP Technical Report TR 37.842
[2] 3GPP Technical Report TR 37.976
[3] 3GPP Technical Specification TS 36.141
[4] 3GPP Technical Specification TS 37.320
[5] DIRECTIVE 2014/53/EU OF THE EUROPEAN PARLIAMENT AND OF THE COUNCIL of 16 Apr. 2014 on the harmonisation of the laws of the Member States relating to the making available on the market of radio equipment and repealing Directive 1999/5/EC
[6] ETSI EN 303 095: Reconfigurable Radio Systems (RRS); Radio Reconfiguration related Architecture for Mobile Devices, 2015
[7] ETSI TR 102 967: Reconfigurable Radio Systems (RRS); Use Cases for dynamic equipment reconfiguration, ETSI, 2015

The invention claimed is:

1. A system comprising:
   at least one sensor, configured to receive a signal with a spatial electromagnetic radiation characteristic from an apparatus and to provide a sensor signal based on the signal received with the spatial electromagnetic radiation characteristic;
   a control unit configured to receive the sensor signal and to transmit a control signal to one or more receivers including the apparatus;

wherein the control signal comprises instructions to use a spatial electromagnetic radiation characteristic different from a predetermined operation mode to instruct the apparatus to deviate from the predetermined operation mode in accordance with the control signal;

wherein the system is configured to transmit the control signal to the apparatus so as to control the apparatus to transmit an output signal using an interface, the output signal comprising information related to at least one of: information related to input samples received by the apparatus; information related to an evaluation of a baseband of the apparatus; and/or information related to an evaluation of commands transmitted to an application hardware layer of the apparatus; or wherein the sensor is one of a plurality of sensors that are distributed nodes or UEs and wherein the measurement system is configured to perform a test in accordance with the control signal outside a measurement chamber.

2. The system according to claim 1, wherein the control signal is configured to cause the apparatus to override a different mode of operation.

3. The system according to claim 1, wherein the control unit is configured to transmit a plurality of control signals to a corresponding plurality of apparatus.

4. The system according to claim 1, wherein the control unit is configured to transmit at least one control signal to the plurality of apparatus so as to orchestrate a test within the wireless communication network cell performed commonly by the plurality of apparatus.

5. An apparatus configured to operate in a system according to claim 1 and to operate according to the control signal.

6. A method for measuring a plurality of apparatus, the method comprising:

operating the plurality of apparatus in a wireless communication network cell;

receiving at least one control signal with the plurality of apparatus from a coordinator node; and performing a test within the wireless communication network cell as an orchestrated test with the plurality of apparatus responsive to the at least one control signal; such that the control signal or a plurality of control signals is transmitted to the plurality of apparatus so as to control the plurality of apparatus to transmit an output signal using an interface, the output signal comprising information related to at least one of: information related to input samples received by the apparatus; information related to an evaluation of a baseband of the apparatus; and/or information related to an evaluation of commands transmitted to an application hardware layer of the apparatus; or such that the plurality of apparatus is one of a plurality of sensors that are distributed nodes or UEs and wherein the test is performed in accordance with the control signal outside a measurement chamber.

7. The method according to claim 6, wherein the plurality of apparatus are distributed nodes or user equipments (UEs) and wherein the test is performed in accordance with the control signal outside a measurement chamber.

8. The method according to claim 6, wherein the control signal orchestrates the plurality of apparatus to act as distributed sensing nodes or probe nodes.

9. The method according to claim 6, wherein the control signal is instructs at least one of the plurality of apparatus to transmit in the cell and/or instructs at least one of the plurality of apparatus to receive in the cell.

10. The method according to claim 6, wherein the control signal is transmitted from a base station.

11. The method according to claim 6, wherein the control signal controls at least one of the plurality of apparatus with regard to a used encryption, an identification or other information relating to the authentication, a type of measurement to be performed and/or a time thereof.

12. The method according to claim 6, comprising:

selecting a subset of the plurality of apparatus so as to participate during the test and selecting other apparatus of the plurality of apparatus to not participate during the test.

13. The method according to claim 12, wherein the subset of apparatus is selected by use of at least one of a software key, a hardware key, a serial number, a MAC-ID and a Transceiver-ID of the selected apparatus comprised in the control signal.

14. The method according to claim 6, wherein the control signal comprises information indicating an action to be performed in the test such that the control signal schedules a plurality of actions for the plurality of apparatus.

15. The method according to claim 6, comprising:

providing, with at least one of the plurality of apparatus, a response signal indicating that an action to be executed in the test will not be executed or is unlikely to be executed; and re-coordinating the test responsive to the response signal; and/or providing, with at least one of the plurality of apparatus, a notification signal indicating that the action to be executed will be executed; and re-coordinating the test responsive to the notification signal.

16. The method according to claim 6, wherein the control signal is provided to comprise instructions for at least one of the plurality of apparatus to use a spatial electromagnetic radiation characteristic different from a predetermined operation mode to instruct the apparatus to deviate from the predetermined operation mode in accordance with the control signal.

17. An apparatus configured to operate as one of the plurality of apparatus in the method according to claim 6 and to operate according to the at least one control signal.

18. The apparatus according to claim 17, wherein apparatus is configured to transmit in the cell or to receive in the cell based on the control signal.

19. The apparatus according to claim 17, wherein the apparatus is configured to control at least one of a used encryption, an identification or other information relating to the authentication, a type of measurement to be performed or a time thereof based on the control signal.

20. The apparatus according to claim 17, wherein the apparatus is configured for determining, based on information contained in the control signal whether to participate during the test or to not participate during the test.

21. The apparatus according to claim 20, wherein the apparatus is configured for using at least one of a software key, a hardware key, a serial number, a MAC-ID and a Transceiver-ID of the apparatus for determining whether to participate during the test or to not participate during the test.

22. The apparatus according to claim 17, wherein the apparatus is configured to operate according to information contained in the control signal, indicating an action to be performed in the test; wherein the control signal schedules a plurality of actions for a plurality of apparatus.

23. The apparatus according to claim 17, configured for providing a response signal indicating that an action to be executed in the test will not be executed or is unlikely to be executed; and/or providing a notification signal indicating that the action to be executed will be executed.

24. The apparatus according to claim 17, wherein the apparatus is configured for operating according to instructions contained in the control signal to use a spatial electromagnetic radiation characteristic different from a predetermined operation mode; wherein the apparatus is configured for deviating from the predetermined operation mode in accordance with the control signal.

25. A method for operating a system comprising at least one sensor configured to receive a signal with a spatial electromagnetic radiation characteristic from an apparatus and to provide a sensor signal based on the received signal, the method comprising;

receiving the sensor signal; and transmitting a control signal to the apparatus such that the control signal comprises instructions to use a spatial electromagnetic radiation characteristic different from a predetermined operation mode to deviate from the predetermined operation mode in accordance with the control signal;

such that the control signal is transmitted to the apparatus so as to control the apparatus to transmit an output signal using an interface, the output signal comprising information related to at least one of: information related to input samples received by the apparatus; information related to an evaluation of a baseband of the apparatus; and/or information related to an evaluation of commands transmitted to an application hardware layer of the apparatus; or such that the at least one sensor is one of a plurality of sensors that are distributed nodes or UEs and wherein the operation of the system is performed in accordance with the control signal outside a measurement chamber.

* * * * *